US012013364B2

United States Patent
Ménard et al.

(10) Patent No.: US 12,013,364 B2
(45) Date of Patent: Jun. 18, 2024

(54) ILLUMINATED ULTRA-THIN CHEMICAL SENSORS, AND SYSTEMS AND METHODS COMPRISING SAME

(71) Applicant: University of Ottawa, Ottawa (CA)

(72) Inventors: Jean-Michel Ménard, Ottawa (CA); Adina Anamaria Luican-Mayer, Ottawa (CA); Ranjana Rautela, Ottawa (CA)

(73) Assignee: University of Ottawa (CA)

( * ) Notice: Subject to any disclaimer, the term of this patent is extended or adjusted under 35 U.S.C. 154(b) by 50 days.

(21) Appl. No.: 16/949,135

(22) Filed: Oct. 15, 2020

(65) Prior Publication Data

US 2021/0109054 A1    Apr. 15, 2021

Related U.S. Application Data

(60) Provisional application No. 62/915,083, filed on Oct. 15, 2019.

(51) Int. Cl.
*G01N 27/30*    (2006.01)
*G01N 27/414*    (2006.01)

(52) U.S. Cl.
CPC ......... *G01N 27/308* (2013.01); *G01N 27/414* (2013.01)

(58) Field of Classification Search
CPC ............... G01N 27/308; G01N 27/414; G01N 27/4141; G01N 27/125
See application file for complete search history.

(56) References Cited

U.S. PATENT DOCUMENTS

| 2012/0266658 A1* | 10/2012 | Akiyama | G01N 27/125 |
| | | | 977/762 |
| 2017/0138879 A1* | 5/2017 | Akiyama | H01L 31/0272 |
| 2017/0227483 A1* | 8/2017 | Lee | G01N 27/127 |

FOREIGN PATENT DOCUMENTS

WO    WO-2017137086 A1 *    8/2017

OTHER PUBLICATIONS

Yang et al., Enhanced acetone sensing properties of monolayer graphene at room temperature by electrode spacing effect and UV illumination, Sensors and Actuators B: Chemical, 2017, 253, 77-84 (Year: 2017).*
Yang et al., Ultraviolet illumination effect on monolayer graphene-based resistive sensor for acetone detection, Vacuum, 2017, 140, 89-95 (Year: 2017).*
Yang et al., Annealing effect on UV-illuminated recovery in gas response of graphene-based NO2 sensors, RSC Advances, 2019, 9, 23343 (Published on Jul. 29, 2019) (Year: 2019).*
Zhang et al., Single-layer graphene-TiO2 nanotubes array heterojunction for ultraviolet photodetector application, Applied Surface Science, 2016, 387, 1162-1168 (Year: 2016).*
Yuan et al., Graphene-based gas sensors, Journal of Materials Chemistry A, 2013, 1, 10078 (Year: 2013).*

(Continued)

*Primary Examiner* — Luan V Van
*Assistant Examiner* — Shizhi Qian
(74) *Attorney, Agent, or Firm* — Price Heneveld LLP

(57) ABSTRACT

Described are various embodiments of a system and method for selectively identifying the presence of a designated chemical species within a chemical sample using a two-dimensional sensor, which, when exposed to illumination, provides a differentiable adsorption sensor response signal for chemical identification.

9 Claims, 19 Drawing Sheets

(56) References Cited

OTHER PUBLICATIONS

Jia et al., Toward high carrier mobility and low contact resistance: laser cleaning of PMMA residues on graphene surfaces, Nano-Micro Letters, 2016, 8(4), 336-346 (Year: 2016).*
Lin et al., Graphene annealing: how clan can it be? Nano Letters, 2012, 12, 414-419 (Year: 2012).*
Dan et al., Intrinsic response of graphene vapor sensors, Nano Letters, 2009, 9(4), 1472-1475 (Year: 2009).*
Dalfovo et al., Synergy between graphene and Au nanoparticles (heterojunction) towards quenching, improving Raman signal, and UV light sensing, ACS Applied Materials & Interfaces, 2014, 6, 6384-6391 (Year: 2014).*
Son et al., Electron beam induced removal of PMMA layer used for graphene transfer, Scientific Reports, 2017, 7, 18058 (Year: 2017).*
Yang et al., Annealing effect on UV-illuminated recovery in gas response of graphene-based NO2 sensor, RSC Advances, 2019, 9, 23343 (Year: 2019).*
Rigoni, F., et al., "Transfer of CVD-Grown Graphene for Room Temperature Gas Sensors," Nanotechnology, 28, Sep. 2017, 414001, DOI: 10.1088/1361-6528/aa8611.
Yang, S., Wei, S.-H., Jiang, C., "Gas Sensing in 2D Materials," Applied Physics Reviews, 4, 021304, Jun. 2017. DOI: 10.1063/1.4983310.
Yang, C.-M., Chen, T.-C., Yang, Y.-C., Meyyappan, M., Lai, C.-S., "Enhanced Acetone Sensing Properties of Monolayer Graphene at Room Temperature by Electrode Spacing Effect and UV Illumination," Sensors and Actuators B: Chemical, Jun. 2017, 253, 77-84, Elsevier, DOI: 10.1016/j.snb.2017.06.116.

* cited by examiner

ILLUMINATED ULTRA-THIN CHEMICAL SENSORS, AND SYSTEMS AND METHODS COMPRISING SAME

CROSS-REFERENCE TO RELATED APPLICATIONS

The present application claims priority to and the benefit under 35 U.S.C. § 119(e) of U.S. Provisional Patent Application No. 62/915,083, filed Oct. 15, 2019, entitled "ILLUMINATED ULTRA-THIN CHEMICAL SENSORS, AND SYSTEMS AND METHODS COMPRISING SAME", the entire disclosure of which is hereby incorporated herein by reference.

FIELD OF THE DISCLOSURE

The present disclosure relates to chemical sensing and, in particular, to illuminated ultra-thin chemical sensors, and systems and methods comprising same.

BACKGROUND

High-sensitivity detection and precise identification of chemicals has a great potential to enable new or refine existing applications in, for example, quality control, military, and environmental and public safety. Graphene, which is a single layer of carbon atoms, is a promising material for sensing traces of chemicals in air and other gaseous environments. Due to its extremely high surface area per unit volume, graphene has an electrical conductivity that is strongly affected by adsorbed molecular species on its surface. A review of sensors comprising two-dimensional materials such as graphene, and a summary of associated applications, can be found in the academic literature. (YANG, B., WEI, S. H., JIANG, C., "Gas Sensing in 2D Materials." Applied Physics Reviews, June 2017. DOI: 10.1063/1.4983310).

Graphene formed by chemical vapour deposition (CVD) has the particular advantages of being low-cost and readily scalable for sensing applications. Furthermore, it has been shown that the electrical resistivity of CVD graphene can be increased during exposure to UV radiation (RIGONI, F., et al., "Transfer of CVD-Grown Graphene for Room Temperature Gas Sensors." Nanotechnology, September 2017, DOI: 10.1088/1361-6528/aa8611), which can lead to a signal enhancement for select volatile compounds such as acetone (YANG, C. M., CHEN, T. C., YANG, Y. C., MEYYAPPAN, M., LAI, C. S., "Enhanced Acetone Sensing Properties of Monolayer Graphene at Room Temperature by Electrode Spacing Effect and UV Illumination." Sensors and Actuators B: Chemical, June 2017. DOI: 10.1016/j.snb.2017.06.116).

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concept(s) described herein to provide a basic understanding of some aspects of the disclosure. This summary is not an extensive overview of the disclosure. It is not intended to restrict key or critical elements of embodiments of the disclosure or to delineate their scope beyond that which is explicitly or implicitly described by the following description and claims.

A need exists for illuminated ultra-thin chemical sensors, and systems and methods comprising same, that overcome some of the drawbacks of known techniques, or at least, provides a useful alternative thereto. Some aspects of this disclosure provide examples of such processes and systems.

In accordance with one aspect, there is provided a method of selectively identifying the presence of a designated chemical species within a chemical sample using a two-dimensional sensor, the method comprising: exposing the two-dimensional sensor to the chemical sample; illuminating the two-dimensional sensor with a designated illumination that induces a designated differentiable adsorption sensor response to the designated chemical species; acquiring a sensor response signal from the two-dimensional chemical sensor in response to said illuminating; and identifying presence of the designated chemical species within the chemical sample upon identifying said designated differentiable adsorption sensor response within said sensor response signal.

In one embodiment, the method further comprises acquiring said sensor response signal from the two-dimensional chemical sensor in absence of said illumination; and comparing said sensor response signal acquired under illumination and in absence of said illumination.

In accordance with another aspect, there is provided a system for selectively identifying presence of a designated chemical species within a chemical sample, the system comprising: a two-dimensional sensor operable to acquire a sensor adsorption response signal when exposed to the chemical sample; a source of illumination operable to illuminate the two-dimensional sensor with a designated illumination that induces a designated differentiable adsorption sensor response to the designated chemical species; a signal acquisition device operable to process said sensor adsorption response to identify presence of the designated chemical species within the chemical sample upon identifying said designated differentiable adsorption sensor response within said sensor response signal.

In one embodiment, the system is further operable to acquire said sensor adsorption response signal in absence of said illumination, and compare said sensor response signal acquired under illumination and in absence of said illumination to identify said designated differentiable adsorption sensor response.

In accordance with another aspect, there is provided a graphene sensor for selectively identifying presence of a designated chemical species in a sample, the sensor comprising a graphene surface and a polymethylmethacrylate (PMMA) residue identifiable thereon, characterized in that, upon illumination of said graphene surface in operation, the sensor exhibits a designated differentiable adsorption sensor response for the designated chemical species.

In one embodiment, the two-dimensional sensor comprises a graphene sheet.

In one embodiment, the two-dimensional sensor is previously subjected to a baking process to produce improved electrical sensing properties.

In one embodiment, the baking modifies one or more of an area, density, thickness, or electrical property of a sensor surface residue.

In one embodiment, the surface residue comprises polymethylmethacrylate (PMMA).

In one embodiment, the PMMA residue is defined by a molecular weight of about 950,000 g/mol prepared in an anisole solution of about 6% concentration.

In one embodiment, the designated differentiable adsorption sensor response comprises a reversal in polarity of a change in electrical resistance of the sensor upon adsorption of the designated chemical species under illumination as compared to adsorption of the designated chemical species in absence of said illumination.

In one embodiment, the designated differentiable adsorption sensor response is characterised by an asymmetric dispersion.

In one embodiment, the wavelength comprises an ultraviolet wavelength.

In one embodiment, the wavelength is between 300 nm and 400 nm.

In one embodiment, the surface contains a coating for improved electrical properties.

In one embodiment, the illuminating produces an enhanced sensing responsivity.

In one embodiment, the designated chemical species is water.

In one embodiment, the designated chemical species is ethanol.

Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein.

Figure 1A:
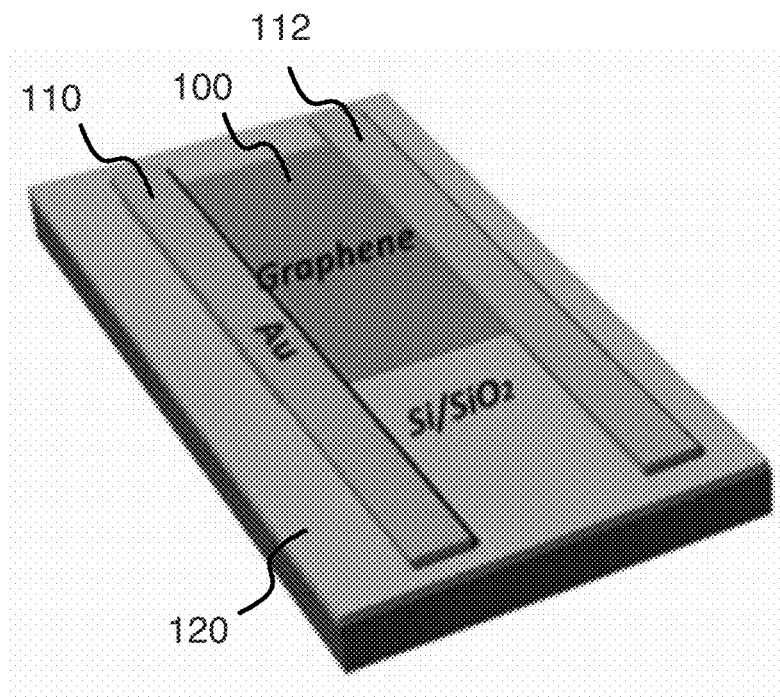
FIG. 1A and FIG. 1B are a schematic diagram and photograph, respectively, of a sensor design with simple electrode sensors with which some embodiments of the disclosure may be practiced.

Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

DETAILED DESCRIPTION

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Various apparatuses and processes will be described below to provide examples of implementations of the system disclosed herein. No implementation described below limits any claimed implementation and any claimed implementations may cover processes or apparatuses that differ from those described below. The claimed implementations are not limited to apparatuses or processes having all of the features of any one apparatus or process described below or to features common to multiple or all of the apparatuses or processes described below. It is possible that an apparatus or process described below is not an implementation of any claimed subject matter.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures and components have not been described in detail so as not to obscure the implementations described herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" may be construed as X only, Y only, Z only, or any combination of two or more items X, Y, and Z (e.g., XYZ, XY, YZ, ZZ, and the like). Similar logic may be applied for two or more items in any occurrence of "at least one . . . " and "one or more . . . " language.

Unless defined otherwise, all technical and scientific terms used herein have the same meaning as commonly understood by one of ordinary skill in the art to which this invention belongs.

Throughout the specification and claims, the following terms take the meanings explicitly associated herein, unless the context clearly dictates otherwise. The phrase "in one of the embodiments" or "in at least one of the various embodiments" as used herein does not necessarily refer to the same embodiment, though it may. Furthermore, the phrase "in another embodiment" or "in some embodiments" as used herein does not necessarily refer to a different embodiment, although it may. Thus, as described below, various embodiments may be readily combined, without departing from the scope or spirit of the innovations disclosed herein.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used in the specification and claims, the singular forms "a", "an" and "the" include plural references unless the context clearly dictates otherwise.

The term "comprising" as used herein will be understood to mean that the list following is non-exhaustive and may or may not include any other additional suitable items, for example one or more further feature(s), component(s) and/or element(s) as appropriate.

The systems and methods described herein provide, in accordance with different embodiments, various examples in which the sensitivity and selectivity of two-dimensional (2D) materials can be enhanced for chemical detection through various processes. While examples described herein will generally refer to graphene-based sensors, it will be appreciated by the skilled artisan that the processes and systems described herein may apply to other suitable ultrathin materials, a term herein used interchangeably with 2D materials, which comprise a single or several atomic layers. Examples of such materials may include, but are not limited to, graphene, graphene derivatives, graphene oxides, doped graphene, molybdenum disulphide ($MoS_2$), black phosphorus (BP), boron nitride (BN), rhenium disulphide ($ReS_2$), and the like, employed independently or in combination.

The terms "selectivity," "selectively," "selective," or the like, as used herein, may, in some embodiments, describe a sensor or sensing signal that is differentiable, recognisable, and/or specific to a particular chemical or set of chemicals. An example of a selective sensing may be, in accordance with at least one embodiment, the generation of an electrical signature upon adsorption of a chemical that comprises a reversal in polarity when the sensor is exposed to light, such as ultraviolet (UV) light (e.g. the resistance of a sensor may increase upon exposure to water under UV light, while exposure to other chemicals causes a decrease in the resistance of the sensor). For example, in some embodiments, a selective signal may comprise an increase (or decrease) in sensor resistance on one time scale upon exposure to a specific chemical, followed by a decrease (or increase) in sensor resistance on a longer time scale. This behaviour may also herein be referred to as "asymmetric dispersion."

Similarly, the term "sensitivity" may refer to the amplitude of a signal generated by exposure of a sensor to samples. For instance, an increase in sensitivity under exposure to (UV) light may relate to an increase in signal magnitude relative to noise, or an increase in the signal-to-noise ratio, of a sensor under (UV) irradiation, in accordance with at least one embodiment. Another example may be that the exposure of a sensor to a specific chemical or set of chemicals causes an increase in the change of resistance of the sensor relative to the change in resistance caused upon adsorption of other chemicals. While the latter example provides an instance of both increased sensitivity and selectivity, the scope of this disclosure is not intended to be limited by such examples, and the skilled artisan will appreciate that other forms of signal generation, analysis and/or processing may also apply to the methods and systems herein described.

While examples of chemical sensing described herein generally relate to the sensing of ethanol (EtOH) and/or water, it will be appreciated by one skilled in the art that the systems and processes herein disclosed may be applied to enable and/or enhance the sensing ability, and/or increase selectivity, of chemical sensors to detect, sense and/or quantify other atomic species, compounds, molecules, and/or substances.

Figure 1B:
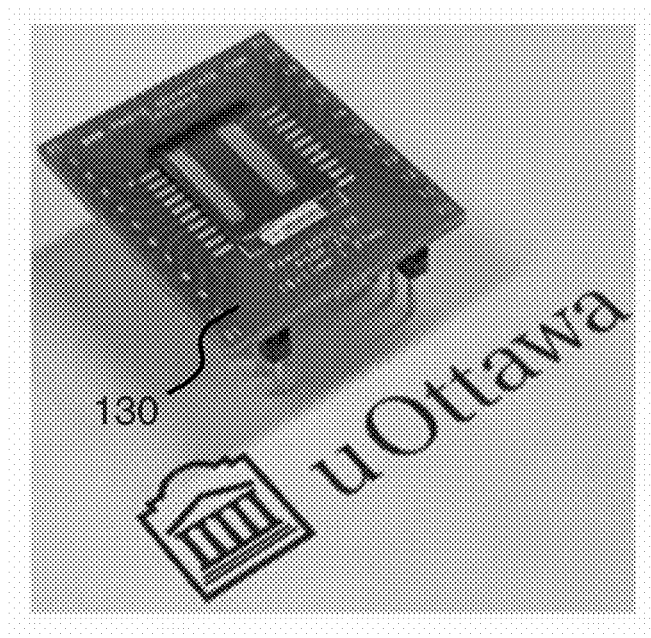

2D chemical sensors typically rely on changes in the electrical properties, such as electrical resistance, capacitance and the like, of an ultra-thin material upon adsorption of or interaction with analyte molecules, as measured by electrodes placed in electrical contact with the sensing material. An example of a design of such a sensor is schematically depicted in FIG. 1A, whereby the sensing layer 100, which in this example is graphene, but may comprise another suitable material, serves as the electrical conduit between electrodes 110 and 112, which may be made of gold or another suitable electrode material. Systems are typically formed on and/or transferred to a thicker solid substrate 120. FIG. 1B shows a picture of a sensor system mounted on a circuit board 130 to perform electrical measurements.

Figure 2A:
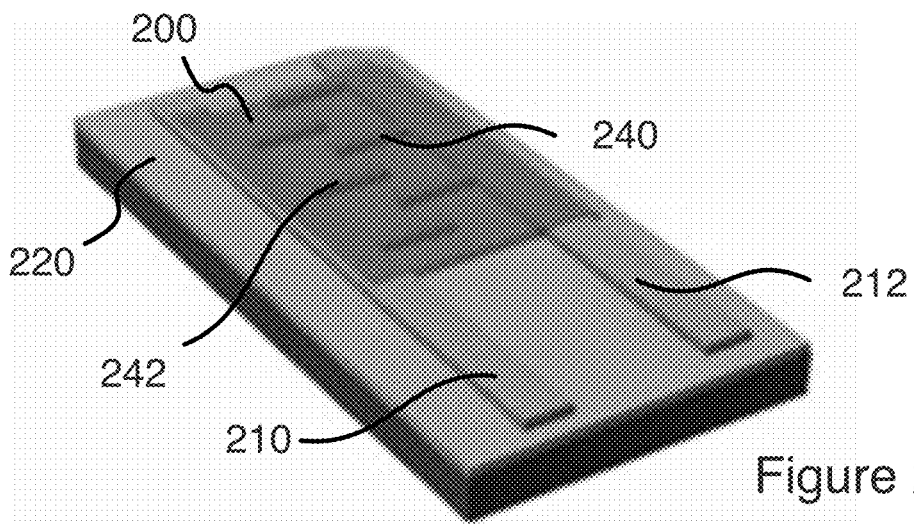
FIG. 2A and FIG. 2B are schematics of a sensor design with interdigitated electrode sensors with which some embodiments of the disclosure may be practiced.
Figure 2B:
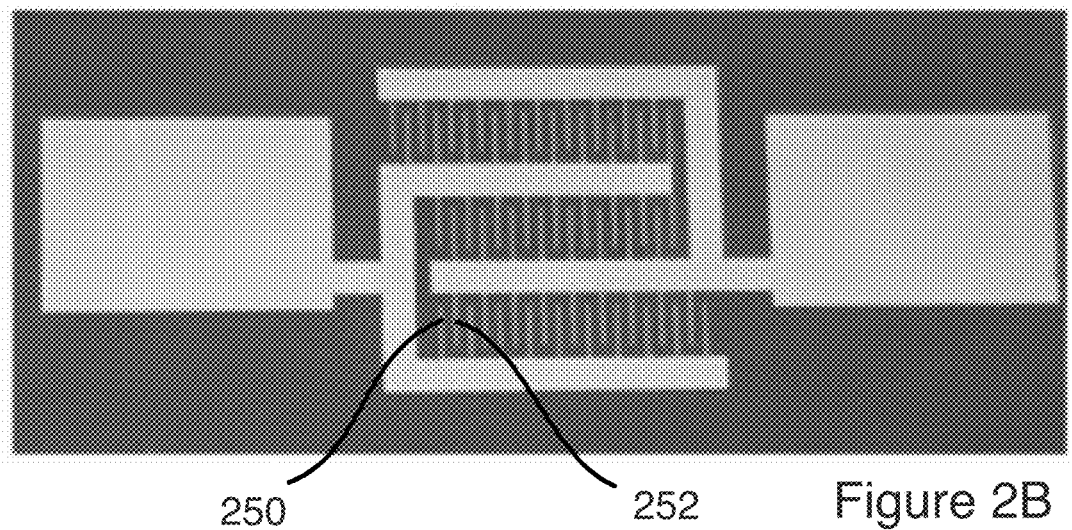

As electrode geometry and configuration can play a role in sensor performance, various approaches can be employed in electrode design. While the electrodes 110 and 112 in FIG. 1A employ a simple electrode sensor (SES) configuration, FIG. 2A schematically illustrates an alternative electrode geometry, in accordance with another embodiment of the disclosure. In this example, the sensing layer 200 atop a substrate 220 connects electrodes 210 and 212, which further comprise an interdigitated electrode system (IES). In this example, the IES comprises interdigitated protrusions 240 and 242 which reduce the distance through the sensing layer 200 between electrodes. In accordance with another embodiment, FIG. 2B illustrates another IES configuration, whereby interdigitated electrodes further comprise yet another IES with smaller interdigitated protrusions 250 and 252. While the electrode geometries in FIGS. 1A, 1B, 2A and 2B present various embodiments for illustrative purposes, electrode systems may adopt any number of alternate configurations and geometries and are not limited to such embodiments.

Figure 3:
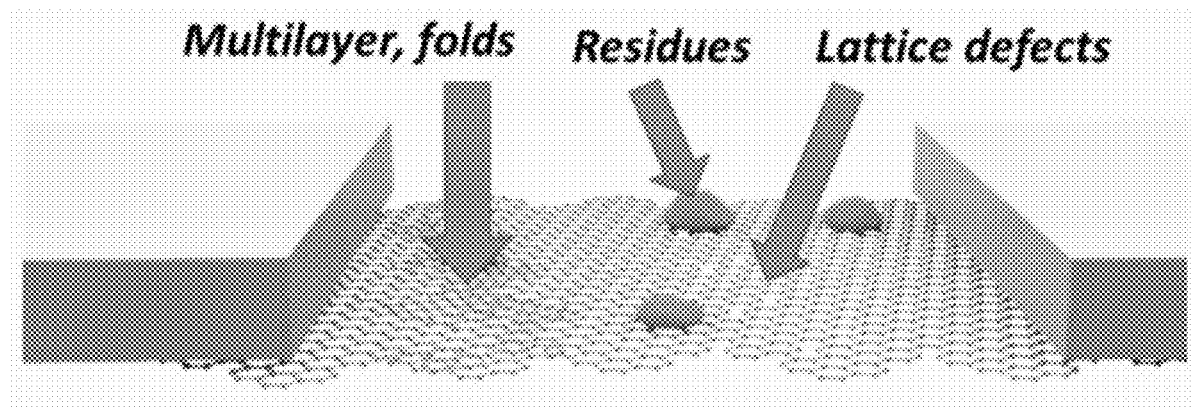
FIG. 3 is a schematic diagram of a sensing surface and its imperfections, in accordance with at least one of the various embodiments.

Sensitivity and response of ultra-thin membranes is additionally highly sensitive to the specific chemical and atomic properties of the sensing layer. For example, CVD graphene sensors, while showing great promise for industrial sensing applications, are often not formed in perfectly crystalline graphene sheets. This may lead to properties that differ from what is expected for intrinsic graphene. Some examples of possible imperfections are shown in FIG. 3 as lattice defects such as missing atoms, folds in the graphene sheet, and multiple layers of graphene (rather than a single atomic layer). As these defects are characterized by specific electronic states, their presence may inadvertently affect the mechanisms of sensing. The precise control and characterization of atomic-scale crystal defects and ascertaining their effects on environmental sensing can be a challenge.

Figure 4:
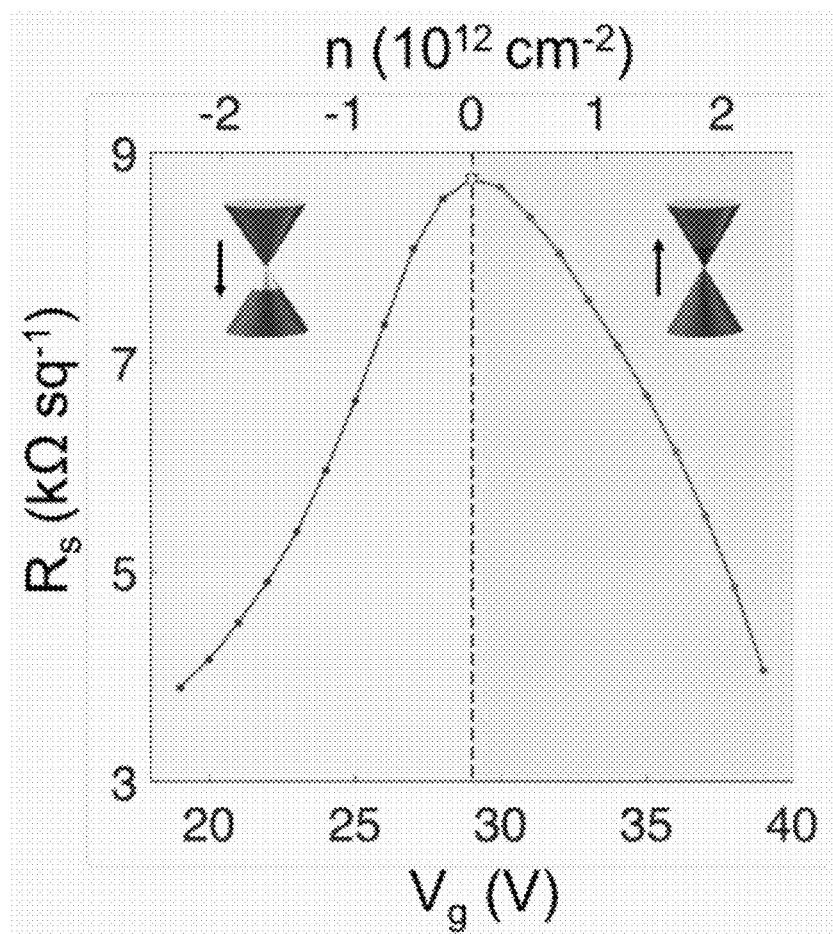
FIG. 4 is a plot of the resistivity of a p-doped graphene field effect transistor as a function of gate voltage, in accordance with at least one of the various embodiments.
Figures 6A, 6B, 6C:
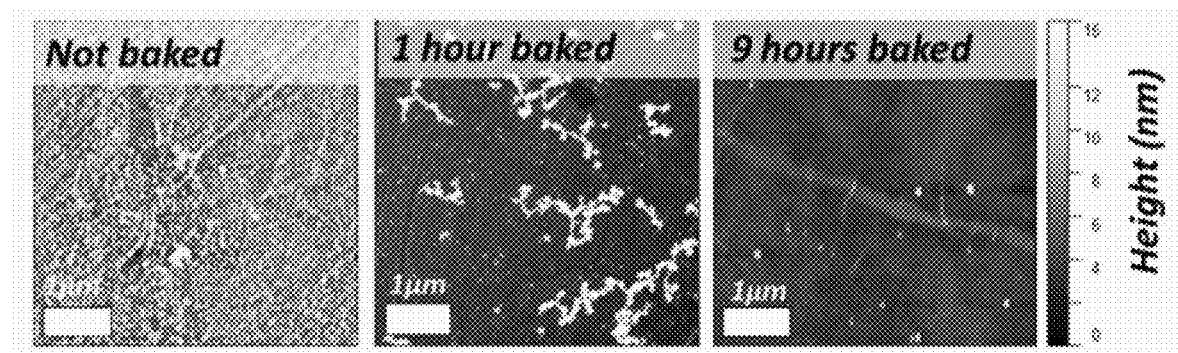
FIG. 6A to FIG. 6C are atomic force microscopy images of a sensing surface after varying bake times, in accordance with at least one of the various embodiments.

Sensor response may also be influenced by chemical impurities in the sensing layer. For example, FIG. 6A to FIG. 6C show the presence of PMMA residues on the graphene sensor. These residues can affect the electronic properties of the sensing surface. For example, FIG. 4 shows a plot of the resistance of a graphene field effect transistor as a function of gate voltage, indicating that the sensor is p-doped. In some embodiments of this disclosure, such p-doped materials can be employed within the systems and processes herein described.

Fabrication and assembly processes of ultra-thin materials can strongly impact sensor surface and electronic properties. For instance, the commonly employed process of transferring graphene from a copper (Cu) foil onto a wafer, as well as the subsequent device fabrication steps, may require protective polymers such as polymethyl-methacrylate (PMMA) on top of graphene during the etching of the Cu foil or during lithographic processes. This may inadvertently result in the presence of polymer residue on the surface of graphene, as schematically illustrated in FIG. 3. The composition and amount of such material can have a significant impact on sensor performance.

Figure 5:
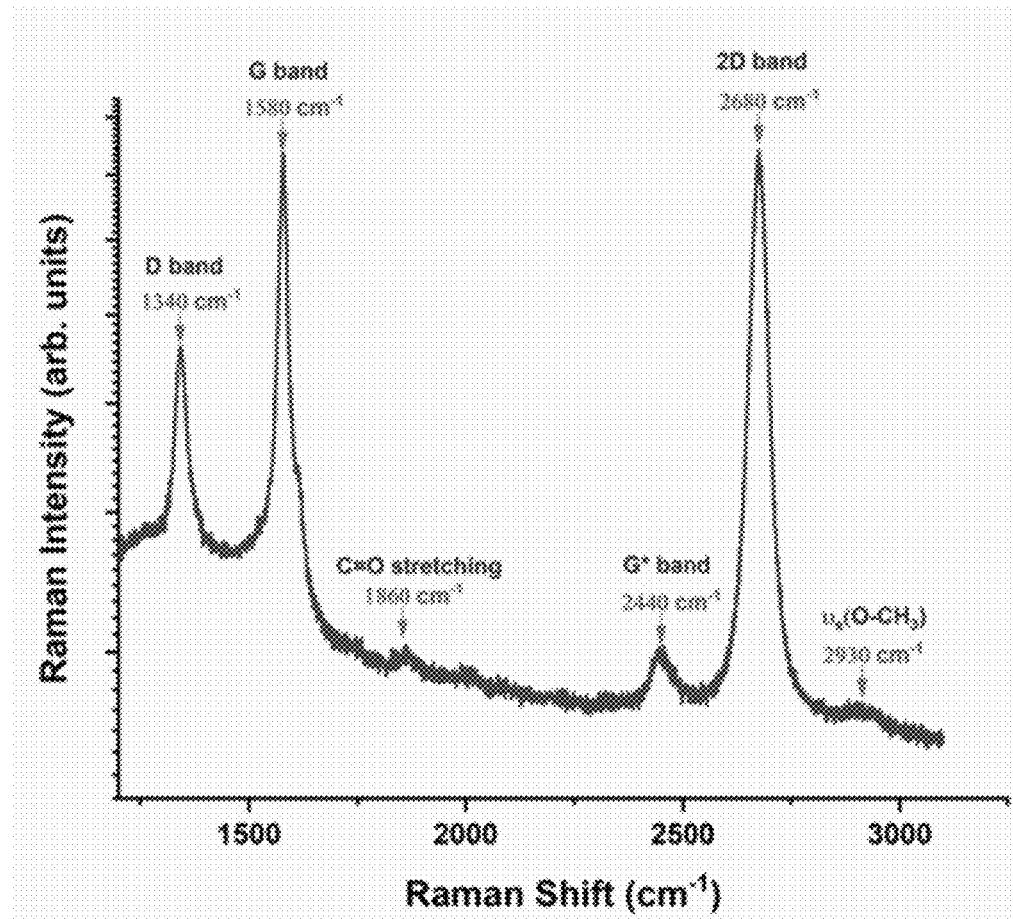
FIG. 5 is Raman spectrum plot of a graphene surface showing the presence of PMMA residue, in accordance at least one of the various embodiments.

A common first step in trying to remove protective layers such as PMMA from graphene is immersion in acetone. This often leaves contaminants on the 2D surface, in part due the high molecular weight of the associated material or polymers such PMMA. An example of the presence of PMMA on a sensing layer, CVD graphene in this case, is shown in FIG. 5, in accordance with one embodiment of the disclosure. Here, a Raman spectrum of a graphene surface exhibits peaks at ~2930 $cm^{-1}$ and 1860 $cm^{-1}$, and 1723 $cm^{-1}$, corresponding to symmetric O—CH3 vibrations and C=O stretching of PMMA molecules, respectively.

Alternate or additional device preparation steps can be employed to pre-treat, or condition, a sensing surface for experimentation and/or analysis. In accordance with an exemplary embodiment, baking (or annealing) the sensing layer in an appropriate environment can remove contaminants, reduce the amount of polymer residue, and/or modify the sensing properties of the device. Such surface treatment relates to a thermal conditioning of the sample surface by leaving the sample inside an oven (e.g. ~400° C.) during a fixed time (e.g. between 30 min to 20 hours) under a controlled atmosphere (e.g. a mixture of $H_2$ and Ar gas).

FIGS. 6A, 6B and 6C show an example of how such pre-treatment can affect the physical and electrical properties of surfaces. In this example, a CVD graphene layer, which was exposed to PMMA during device preparation, shows stark differences in topographic images upon various exposures to baking in a mixture of argon (Ar) and hydrogen ($H_2$) gas. FIG. 6A, wherein the surface was not exposed to baking, shows that a graphene sensor exhibits a significantly higher fraction of membrane surface coverage by contamination (approximately 25% coverage, in this example) than it does following one hour of exposure to 400° C. (approximately 8% in FIG. 6B). After 9 hours of baking, the graphene surface exhibits almost no contamination (less than 1% in FIG. 6C). In this example, the sensor was placed inside a quartz cell purged for 10 min with a 95:5 Ar:$H_2$ gas mixture prior to baking. However, it will be appreciated by the skilled artisan that the baking environment can be tuned to achieve various performance parameters. For instance, baking at different temperatures and/or in alternative gasses, and/or chemical rinsing, may be employed to tune signal enhancement and/or selectivity, in accordance with some embodiments.

In some embodiments, the size, or grain size, of contaminants may additionally or alternatively play a role in device functionality. FIGS. 6A, 6B and 6C also show clustering of contaminants upon exposure to baking at 400° C., with contaminated regions increasing in dimension from 4 nm to 95 nm in FIGS. 6A and 6B respectively.

Figure 7A:
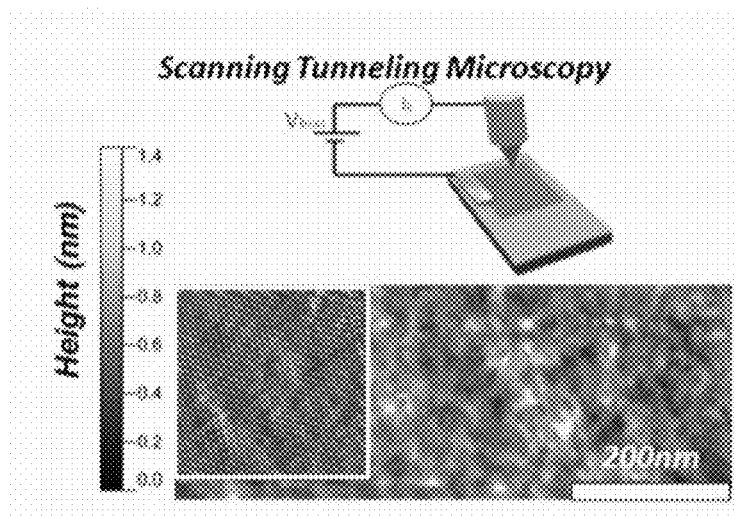
FIG. 7A and FIG. 7B are a scanning tunneling microscope image and corresponding scanning tunneling spectroscopy plot, respectively, of a p-doped graphene sensor, in accordance with at least one of the various embodiments.
Figure 7B:
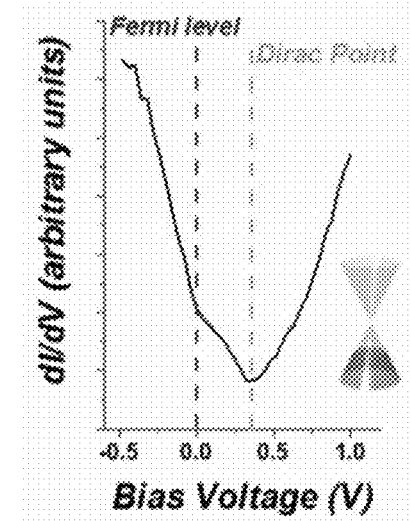

Furthermore, baking can also decrease surface roughness, which can be employed to varying degrees in various embodiments herein disclosed. In FIG. 6C, where the membrane is almost free of contaminants, the atomically clean lattice was accessible for scanning tunneling microscopy and spectroscopy experiments, at room temperature, to locally characterize the morphological and electronic properties of the sensing surface. Large areas are found to be free of residues and of up to 1 nm roughness, as the graphene conforms to the $SiO_2$ surface, as shown in scanning tunneling microcopy (STM) images in FIG. 7A. Upon zooming in, the graphene lattice can be observed with atomic resolution, as presented in the inset of FIG. 7A. By recording the tunneling differential conductance, dI/dV, scanning tunneling spectroscopy gives access to the local density of electronic states. The spectrum recorded at the point indicated in FIG. 7A is presented in FIG. 7B, where the position of the Fermi level and Dirac point of graphene are indicated. In neutral graphene, these two points coincide. In this example, although locally clean, the graphene sensor has a p-doping level $n=8\times10^{12}$ $cm^{-2}$, corresponding to a shift in Fermi level of ~330 meV.

Figure 8A:
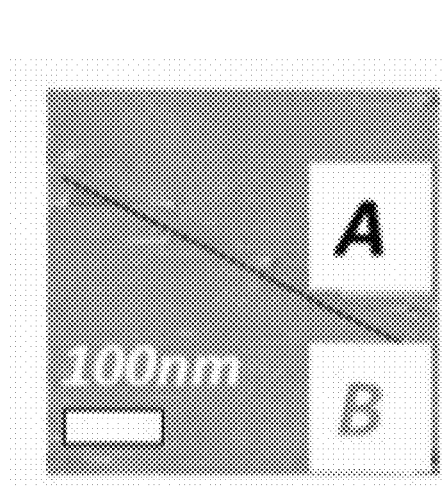
FIGS. 8A and 8B are a topographical image and corresponding scanning tunneling spectroscopy plots, of adjacent regions of a graphene sensor, in accordance with at least one of the various embodiments.
Figure 8B:
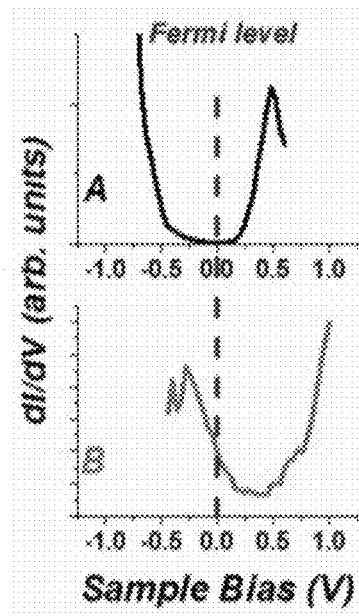

In other embodiments, varying doping levels can be employed to affect sensing performance. An example of such doping levels is shown in FIGS. 8A and 8B. Spectroscopic data (FIG. 8B) acquired in two adjacent regions (Areas A and B in FIG. 8A), separated by an extended defect (dashed black line in FIG. 8A), together with the topographic image in the inset show different doping levels, where Area A is less doped. Such surfaces may be due to the effect of the $SiO_2$ substrate that is known to host an electrostatic potential due to the presence of randomly distributed trapped charges in the oxide. Alternatively, such a situation may arise due to a fold in the graphene surface, which is a common occurrence at the transfer step. A fold could result in a multilayer region, with more metallic electronic band character than a monolayer, and thus with a Fermi level less affected by the presence of doping. Such nanoscale imperfections can thus be controlled and/or utilized in various embodiments of the instant application for tuning sensor performance.

Figure 9A:
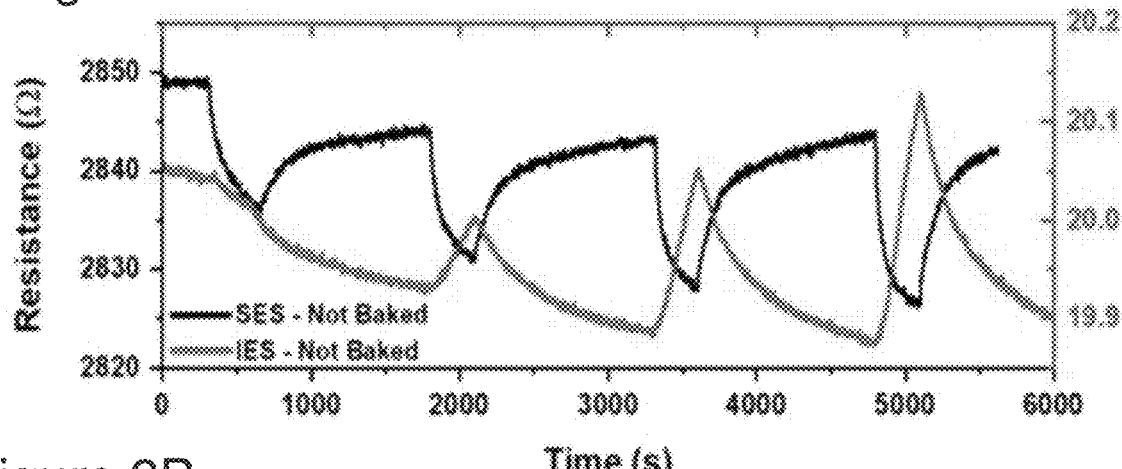
FIG. 9A and FIG. 9B are plots of sensor resistance versus time without baking the sensor (FIG. 9A) and after baking the sensor (FIG. 9B), for various electrode configurations, in accordance with some of the various embodiments.
Figure 9B:
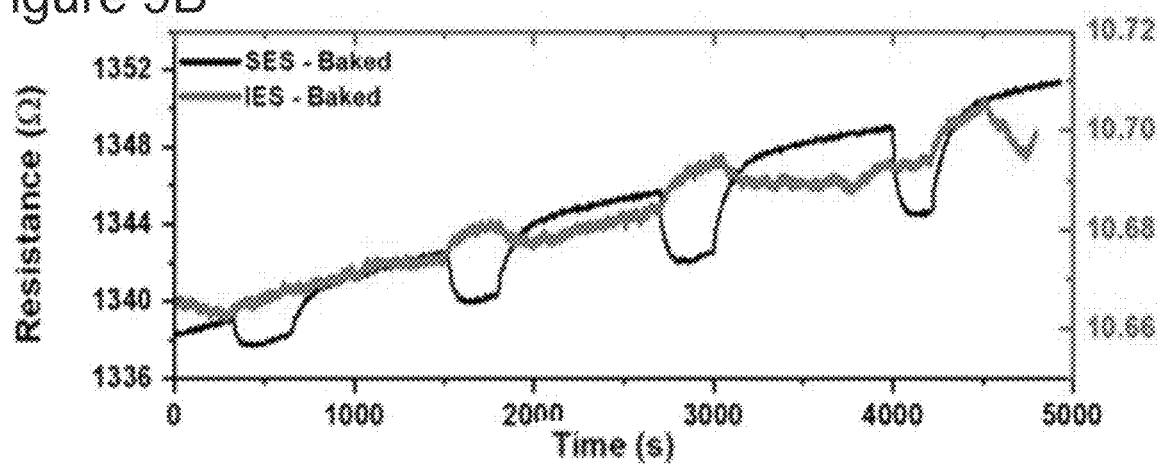
Figure 10:
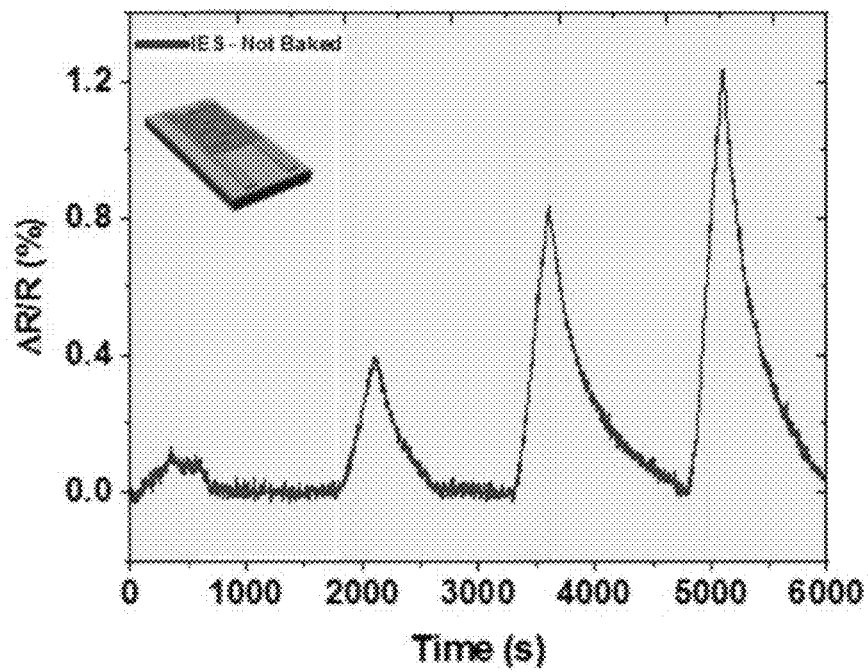
FIG. 10 is a plot of the baseline-subtracted evolution of resistance as a function of time for a sensor with interdigitated electrodes, in accordance with at least one of the various embodiments.

With reference to FIGS. 9, 10 and 11, and in accordance with some exemplary embodiments, the electrical performance of devices prepared using various configurations of electrodes, and/or one or more of the pretreatment steps described above, will now be described with respect to the sensing, by way of example, of the volatile compound EtOH.

FIGS. 9A and 9B show plots of the resistance versus time of a CVD graphene sensor with SES and IES electrode configurations as described in FIGS. 1A and 2B, respectively. In FIG. 9A, SES and IES sensors were rinsed in acetone as a first pretreatment step, while those in FIG. 9B were subsequently baked for 1 hour. In accordance with some embodiments, the resistance of the sensor changes in response to the adsorption of EtOH to the graphene surface. In these examples, sensors were exposed to EtOH at concentrations of, in order, 1400 ppm, 2730 ppm, 4000 ppm and 5200 ppm, with each exposure separated by 20 minutes of purging with $N_2$.

In FIGS. 9A and 9B, both SES and IES baked systems exhibited a lower sensitivity than their respective unbaked counterparts, with this effect being more pronounced by as much as an order of magnitude for the SES system. In this example, the SES system experiences a reduction in resistance in the presence of EtOH, while an increase in resistance was observed for the IES system. As this effect may be related to a different level of doping level for the IES system, electrode configuration and/or doping can be modified to tune the response of the system in various embodiments. As will be appreciated by the skilled artisan, while the examples in FIGS. 9A and 9B show a particular polarity of change in resistance upon EtOH adsorption (i.e. an increase or a decrease in resistance upon adsorption), the response of the system may be tuned or inverted with different environmental and/or sensing parameters, examples of which may include, but are not limited to carrier gas, electrode geometry, temperature, baking time, baking conditions, electrode configuration, electrode material, and the like. For instance, the geometrical arrangement of the IES system, which results in the system comprising many graphene resistors in parallel, can provide orders of magnitude of difference in absolute sensor resistance as compared to the SES system. Such sensor resistance may be tuned to provide a lower or higher sensor resistance, which may in turn provide control over, for instance, signal polarity.

In accordance with at least one embodiment, FIG. 10 shows the time evolution of the resistance of the unbaked IES device from FIG. 9A upon exposure to EtOH at concentrations of, in order, 1400 ppm, 2730 ppm, 4000 ppm and 5200 ppm, with each exposure separated by 20 minutes of purging with $N_2$. In this example, the change in resistance relative to the baseline sensor resistance is presented, showing an increasing relative change in resistance with increasing EtOH concentration. In some embodiments, additional or alternative analysis may be performed to improve sensor readings, such as baseline subtraction, filtering, and the like.

FIGS. 11A to 11D presents exemplary responses of a graphene sensor with SES electrodes upon various surface treatments. In these examples, a baseline was subtracted from the data for clarity. The surfaces were exposed to back-to-back concentrations of 1400 ppm, 2730 ppm, 4000 ppm, and 5200 ppm of ethanol, respectively. In between each exposure of the sensors to ethanol, the chamber was purged with $N_2$ for a period of 20 minutes. The concentration of the ethanol was obtained, in accordance with at least one embodiment, using Antoine's equation and parameters from partial pressure tables for ethanol.

Figure 11A:
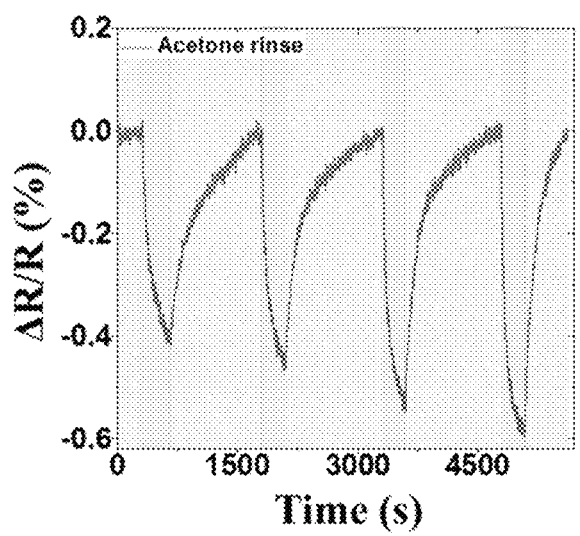
FIGS. 11A to 11D are plots of the evolution of relative change in resistance for graphene sensors upon exposure to ethanol as a function of various surface treatments following a 2D material transfer process, in accordance with some of the various embodiments.
Figure 11B:
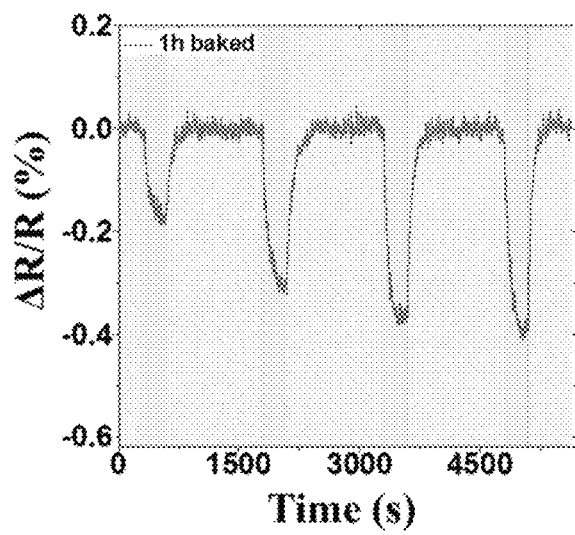
Figure 11C:
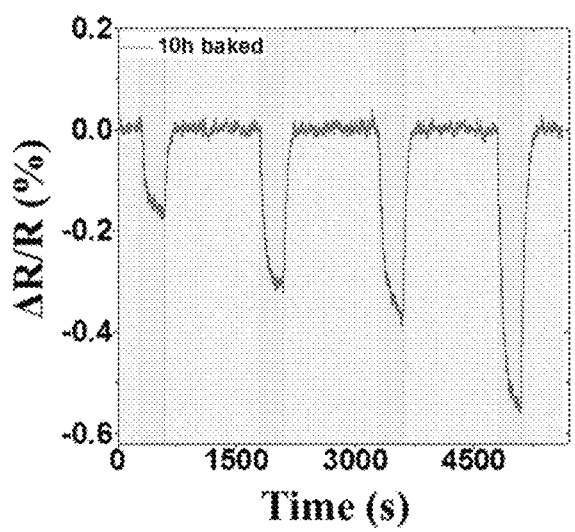

FIG. 11A shows the sensing response of a device that was cleaned by wet removal of PMMA in acetone. In this example, upon exposure to ethanol, the resistance of the graphene sheet decreases. An additional step of one hour of baking (FIG. 11B) was found to further remove PMMA residue as discussed above (baking at 400° C. in a 95:5 $Ar:H_2$ gas mixture). Interestingly, in this case, the response is lower. When the sensor surfaces are baked for 10 hours (FIG. 11C), however, they recover higher sensitivity at higher concentrations. In accordance with some embodiments, baking time and conditions can be selected to provide the desired sensor response. For example, while the sensor treatment steps in FIGS. 11A to 11C may be employed in their entirety to achieve a maximal sensitivity, other embodiments may comprise baking of less time to achieve more desirable sensing performance.

Figure 11D:
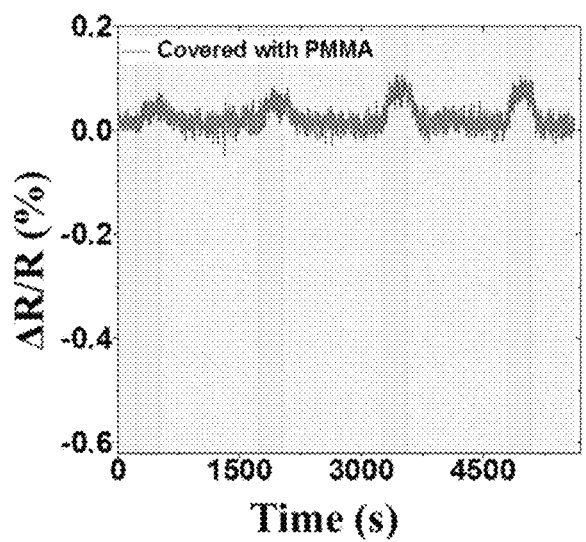

FIG. 11D shows an example in which the sensor was fully covered by PMMA. In this case, the response was found to be very weak (below 0.1% sensitivity), and exhibited a signal of the opposite polarity (i.e. the resistance increased upon exposure to EtOH). While this demonstrates that graphene is the participant in sensors with higher sensitivity, other embodiments may include surface modification to graphene or other ultra-thin membranes to achieve desirable performance.

As the presence of PMMA or other residues and/or surface treatments can play a significant role in sensor performance through modification of the electrical properties, such as electrical resistance, of the membrane, some embodiments of the present disclosure comprise controlling the properties of said residues, treatments, or modifications for improved sensor performance towards one or more chemical species of interest.

Figure 12:
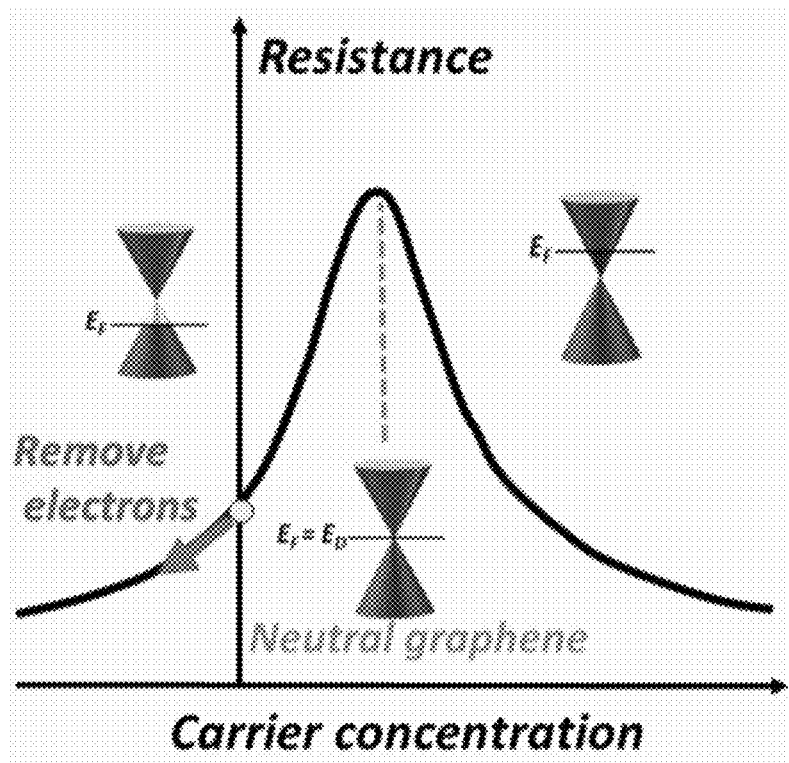
FIG. 12 is a schematic diagram of the effect that carrier concentration has on the resistance of a graphene sensor, in accordance with at least one of the various embodiments.

The sensing mechanism governing the detection of EtOH by a CVD graphene sensor will now be described by way of example for some embodiments of the present disclosure. The resistance of graphene is charged away from the neutrality point by adsorbates that act as either acceptors or donors. FIG. 12 schematically illustrates the basics of this ambipolar field effect in graphene. To understand the effect of a particular airborne chemical, the doping level of the graphene sensors should be understood before exposure to the gas. In this example, the graphene sensor is p-doped, which may be determined from STM data or the gating response, as discussed above.

Figure 13:
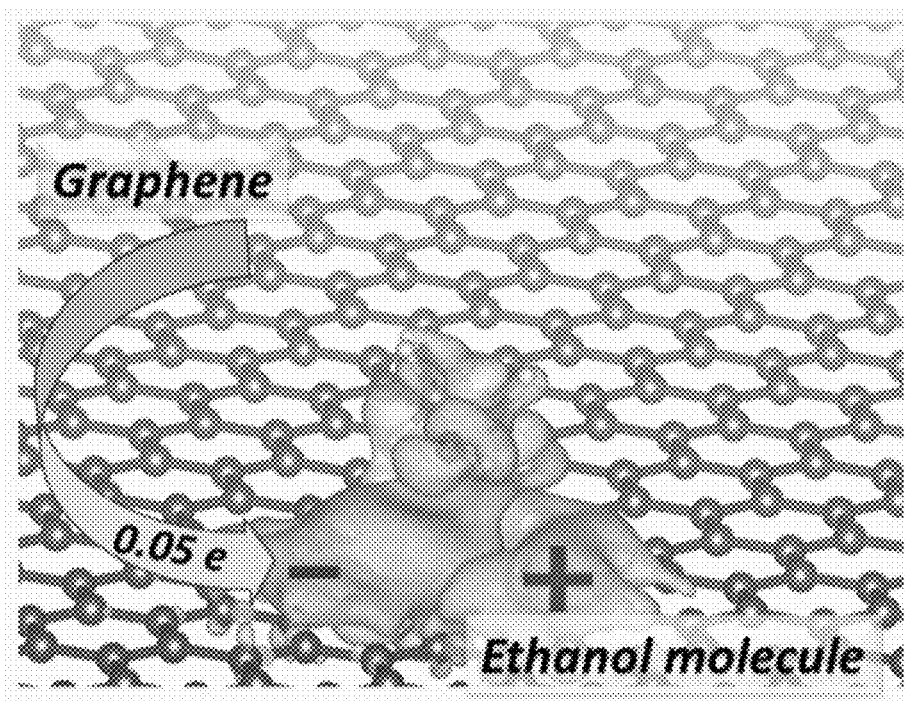
FIG. 13 is a schematic diagram of the geometry of an adsorbed ethanol molecule and associated charge density distribution, in accordance with at least one of the various embodiments.

The sensing mechanism may also be explored by Density Functional Theory (DFT) calculations. FIG. 13 illustrates the geometry of an adsorbed molecule and the charge density difference induced by assembling the EtOH-graphene system from isolated parts (i.e. the EtOH molecule and the graphene sheet). In this example, positive and negative charge differences between molecular portions are depicted, illustrating a charge redistribution between ethanol and graphene which enables molecular sensing. Moreover, FIG. 13 shows that although the net charge transfer is such that ethanol acts as an acceptor and removes electrons from graphene, the charge transfer process is more complex. Upon adsorption, the molecule appears to locally polarize graphene, introducing both positive and negative charge carriers. In this case, the calculated charge transfer is 0.05 e from graphene to a single ethanol molecule. In some embodiments, ethanol molecules may aggregate into hydrogen-bonded clusters (e.g. dimers, tetramers, pentamers, etc.) at higher surface coverage of EtOH on, for example, hydrophobic surfaces such as graphene. In such situations, surface charge transfer from graphene to EtOH have been calculated to be, per molecule, 0.048 e, 0.025 e and 0.015 e for a single EtOH molecule, an EtOH dimer and EtOH tetramer, respectively. In these examples, while clusters behave as p-dopants, the clustering decreases p-doping of graphene per molecule, which is consistent with experimental results of lower sensor response with increasing EtOH concentration, as shown in FIGS. 11A to 11D.

Density Functional Theory (DFT) calculations in FIG. 13 were performed using the projector-augmented wave method in the Vienna Ab initio Simulation Package (VASP) suite. The optB86b-vdW DFT functional was employed to include a contribution from non-local correlation effects. The graphene sheet was modeled using a 6×6 supercell (72 carbon atoms) with a calculated C—C bond length of 1.44 Å. The periodically repeated single-layers were separated by at least 18 Å of vacuum. The energy cutoff for the plane-wave expansion was set to 400 eV and a 3×3×1 k-point grid was used. The charge transfer was calculated using iterative Hirshfeld (Hirshfeld-I) charge partitioning. In the iterative Hirshfeld algorithm, the neutral reference atoms are replaced with ions with fractional charges determined together with the atomic charge densities in an iterative procedure. In some embodiments, the size of the charge transfer is to some extent dependent on the method of calculation used. Comparison of results with the classical Hirshfeld charge analysis shows a similar resulting charge partitioning on both magnitude and direction.

As introduced above, and in accordance with some embodiments, the response of 2D chemical sensors may also be enhanced through illumination, and as such the wavelength of light used to illuminate surfaces may also serve as a tuning parameter in optimizing sensor performance. By optically inducing changes in the sensing properties of a device, binding energies between chemical species and the sensing surface and/or surface imperfections such as residual polymer resist or crystal defects may be altered to provide signal enhancement and/or selectivity in chemical sensing, as detailed below.

By way of example, various select embodiments will now be described with respect to FIGS. 14 to 17, each of which in these examples are comprising a graphene sensor illuminated by UV light. As will be appreciated by one skilled in the art, embodiments are not limited to those provided below. For instance, parameters such as wavelength of illumination and the surface chemistries described are provided for illustrative purposes only, and the overall scope of these teachings is not limited to such examples.

The following examples describe a sensor with a sensing area made of commercially available CVD graphene grown on a copper sheet. For the sensor fabrication, this sheet is cut in square sections of 1 cm×1 cm and the graphene is covered with a 500 nm layer of PMMA. To ensure proper graphene transfer and efficient etching of the copper foil, the backside of the foil is cleaned from residues with an oxygen-based reactive ion etching. The sample is placed into copper etchant to obtain a floating PMMA/graphene sheet, which is transferred onto a Si/SiO$_2$ substrate. The PMMA layer on the graphene is removed in two steps: first by cleaning the sample in an acetone bath at 50° C. for one hour and then by baking it for an hour at 400° C. in a 95:5 Ar:H$_2$ atmosphere. Finally, two rectangular gold electrodes (SES) are thermally evaporated using a shadow mask placed on top of the graphene surface. A picture of the sensor connected by gold nanowires to a PCB mount is shown in FIG. 1B. While the PMMA used in this example is 6% PMMA (Microchem 950 PMMA A6, 950,000 g/mol) in anisole, it is appreciated by the skilled artisan that other forms or concentrations of PMMA, for instance, can be used to achieve the desired sensing properties as herein described.

Figure 14:
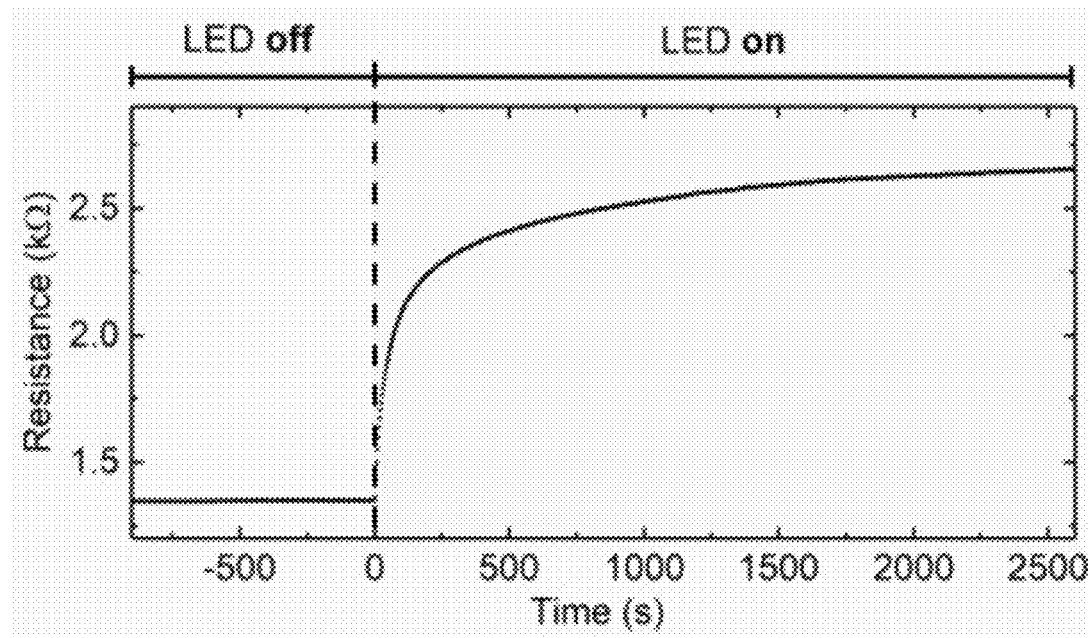
FIG. 14 is a plot of the resistance of a graphene sensor with and without illumination, in accordance with at least one of the various embodiments.

FIG. 14 shows the resistance of a graphene sensor with and without illumination. In this and following examples, illumination is provided by a light emitting diode (LED) which shone at a wavelength of 365 nm at 4 mW/cm$^2$ on a sensor with an area of 1 cm$^2$. When exposed to light at 0 s in FIG. 14, the response signal increased significantly. Moreover, the signal shows that the sensors used have intrinsic low noise, with no need to deconvolute the purely electric and optically-induced signals with a homodyne technique.

Figure 15:
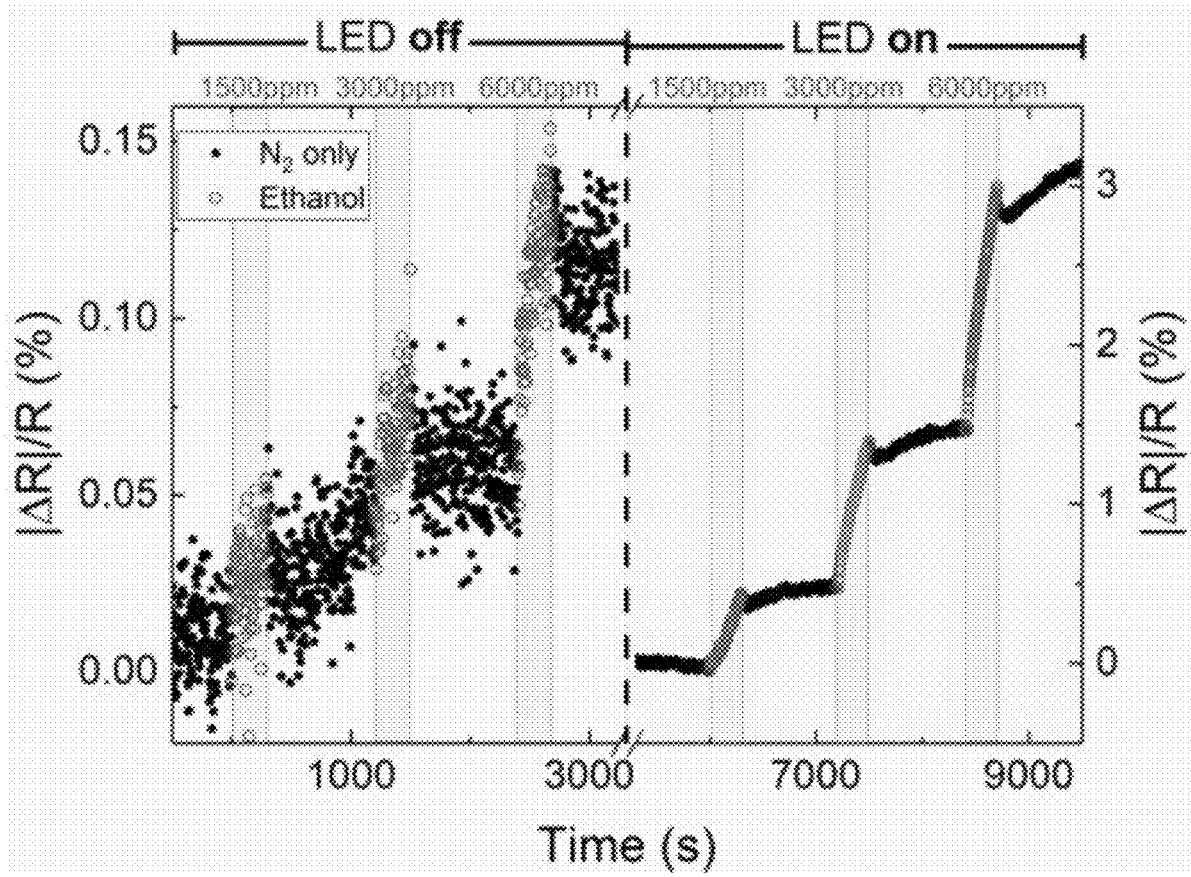
FIG. 15 is a plot of the relative change in resistance of a graphene sensor in the presence of various concentrations of ethanol, with and without illumination, in accordance with at least one of the various embodiments.

FIG. 15 shows that optical excitation with an LED increases by more than one order of magnitude the normalized change in resistivity of the sensor at different concentrations of EtOH. In this example, EtOH was introduced in concentrations of 1500 ppm, 3000 ppm, and 6000 ppm in N$_2$ gas.

The sensors herein described are also able to sense more than one chemical. This is demonstrated in FIG. 16 using ethanol and water vapor as the substances to be detected at concentrations of 3000 ppm in N$_2$. Measurements are first collected when the device is in the dark (LED off) and then compared to measurements obtained with a homogeneous optical illumination of the sensing area (LED on). In the LED-off setting, the graphene resistance gradually decreases after the release of a constant concentration of ethanol (1604) or water vapor (1602). In this example, the resistance as a function of time follows a dual exponential decay corresponding to time constants of ~35 s and ~300 s. LED illumination at a wavelength of 365 nm significantly modifies these dynamics. After introducing ethanol in the chamber (1608), the change in resistance inverses its sign. Although it still follows a dual exponential decay, this change corresponds to an increase in resistance instead of a reduction. Furthermore, when ethanol is replaced by water vapor (1606), the resistance first increases on a ~35 s time scale before decreasing on a slower time scale. The measured signal for water (1606), which resembles an asymmetric dispersive feature, has a very distinctive shape in comparison to the one obtained with ethanol (1608). For instance, the noted differentiable sensor response, characterised in this example by an asymmetric dispersion in time (i.e. a faster rise followed by a slower drop) only occurs for one of the noted chemicals. This thus provides a means of improving selectivity of the sensor for different chemicals.

Figures 16, 17:
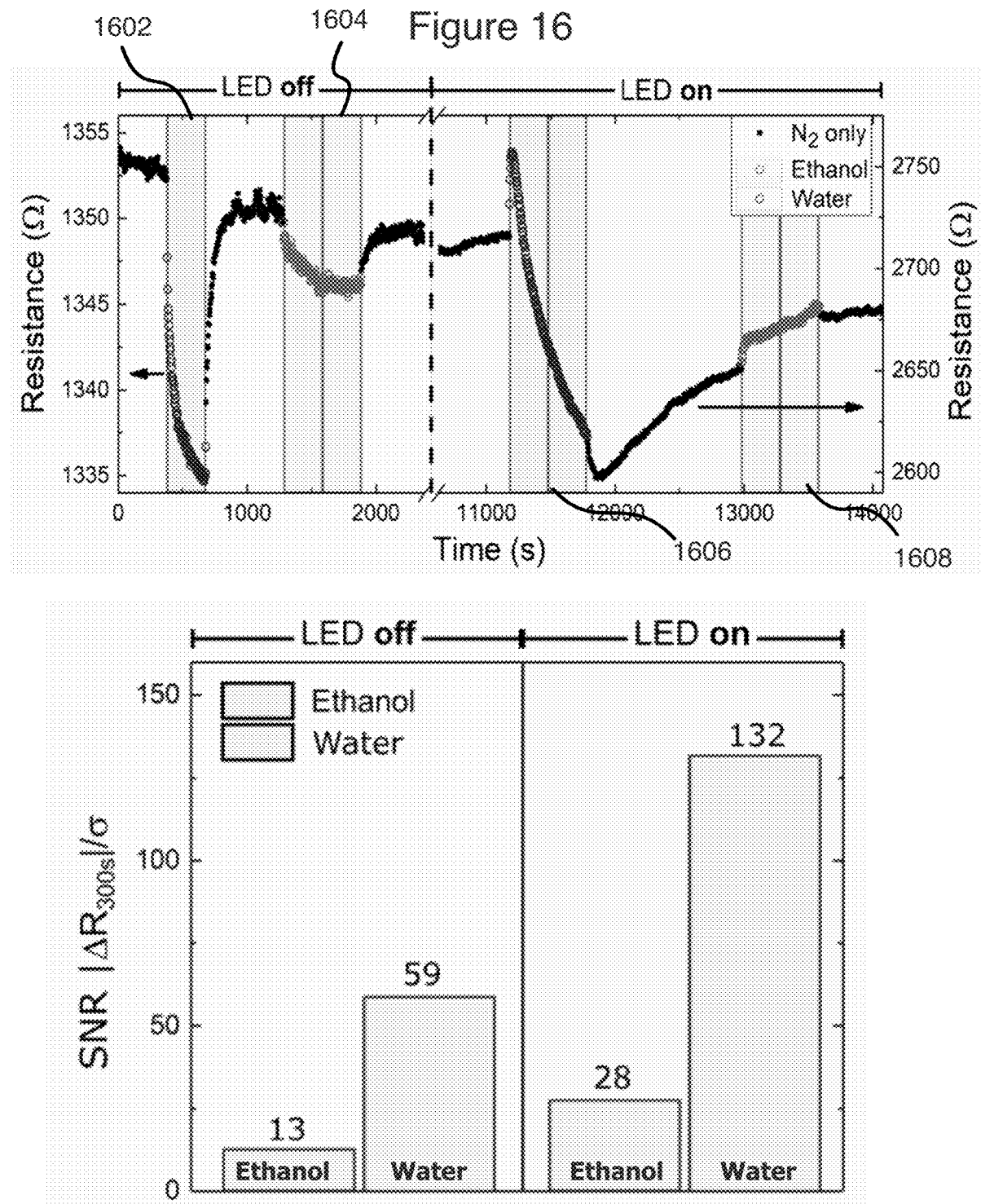
FIG. 16 is a plot of the change in resistance of a graphene sensor when exposed to alternating samples of water and ethanol, with and without illumination, in accordance with at least one of the various embodiments.
FIG. 17 is a plot of the signal-to-noise ratio of the sensor for the detection of water and ethanol, with and without illumination, in accordance with at least one of the various embodiments.

The results presented in FIG. 16 demonstrate that a LED can be used to enable a new selectivity channel for the detection and identification of chemicals. Moreover, two distinct binding interactions associated to the fast and slow dynamics observed when a chemical interacts with the surface of CVD-graphene are revealed. Importantly, optical illumination can affect differently binding mechanisms differently, allowing for chemicals to be distinguished.

Moreover, in FIG. 16, optical illumination increases, by about a factor of ~5, the absolute value of the peak-to-peak resistance change measured during the first 300 s after the release of water or ethanol in the sensor chamber ($|\Delta R_{300\,s}|$). The use of illumination can thus also improve the signal-to-noise (SNR) properties of sensors. The signal-to-noise ratio, which is the fundamental limit to chemical detection sensitivity, can be evaluated from dividing $|\Delta R_{300\,s}|$ with a noise figure, such as the standard deviation $\sigma$ measured when the resistance is constant. FIG. 17, showing the SNR measured for the detection of EtOH and water, each at 3000 ppm in $N_2$, shows that SNR, defined here as the maximum change in resistance over a 300 s period after the release of the chemical divided by the standard deviation measured when the resistance is constant, increases by more than a factor of 2 due to optical illumination, demonstrating that the use of a LED improves the detection sensitivity of the sensor.

Figure 23:
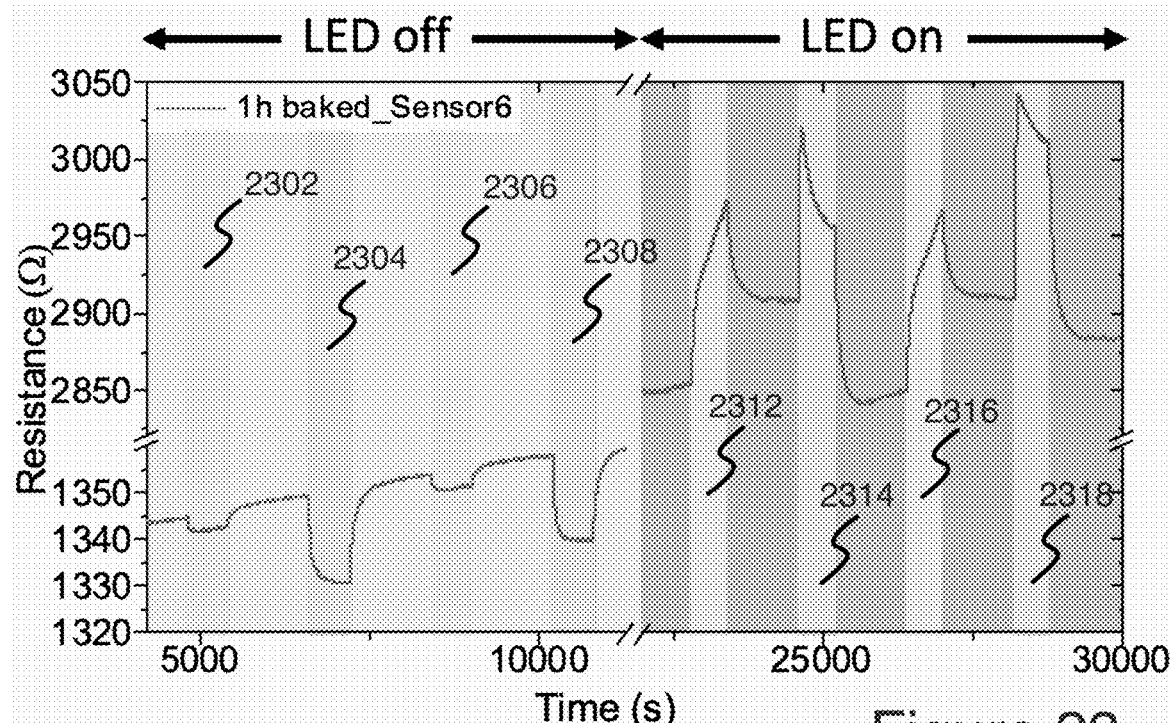
FIG. 23 is a plot of a change in resistance of a graphene sensor baked for one (1) hour when exposed to alternating samples of water and ethanol, with and without illumination, in accordance with at least one of the various embodiments.
Figure 25:
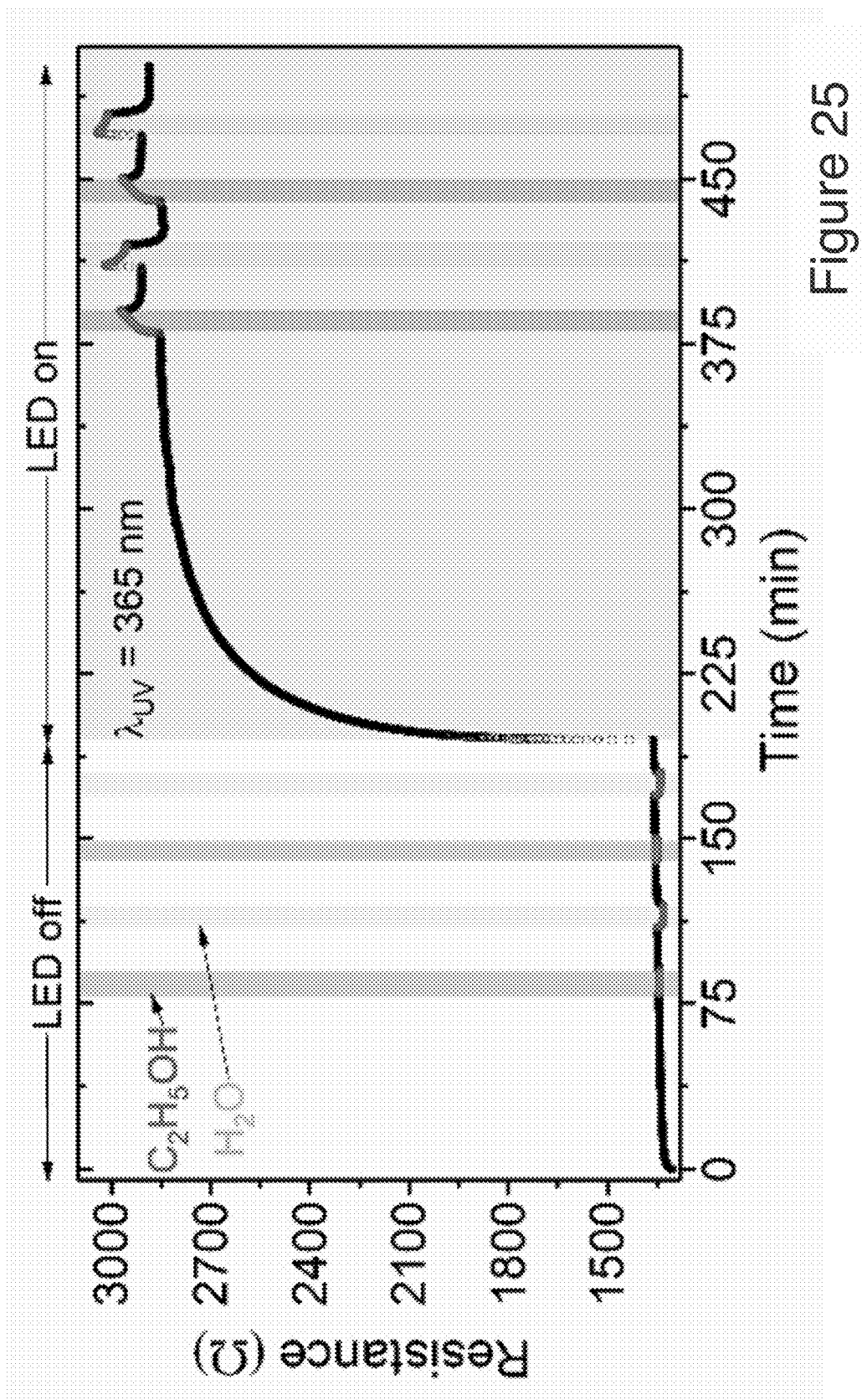
FIG. 25 is a zoomed-out plot of the plot shown in FIG. 23.

Another example of sensing more than one chemical, in accordance with at least one of the various embodiments, is shown in FIG. 23. In this example, the resistance of a sensor that was baked for 1 hour as described above is first recorded while the device is in the dark (LED off) and then compared to measurements obtained with a homogeneous 11 mW optical illumination of the sensing area with a wavelength of 365 nm (LED on). In the LED-off setting, the graphene resistance gradually increases, but exhibits decreases upon exposure to ethanol (2302 and 2306). A similar behaviour is observed, but to a greater degree, upon exposure to water vapour (2304 and 2308). LED illumination at a wavelength of 365 nm significantly modifies sensing behaviour. Exposure to ethanol vapour under UV illumination (2312 and 2316) results in an increase in sensor resistance that is more pronounced than the corresponding decreases in 2302 and 2306. Furthermore, exposure to water vapour under UV illumination in 2314 and 2318 results in signals that exhibit asymmetric dispersion in that the resistance first increases on short time scales before decreasing at longer time scales. In this example, UV illumination provides a means of differentiating two chemicals (improving the selectivity of the sensor), as these two species can be associated with signature changes in resistance of the sensor over time. FIG. 25 shows a zoomed-out plot of the data shown in FIG. 23. In this example, the sensor's base resistance increased significantly over 2.5 hours upon UV illumination.

Figure 24:
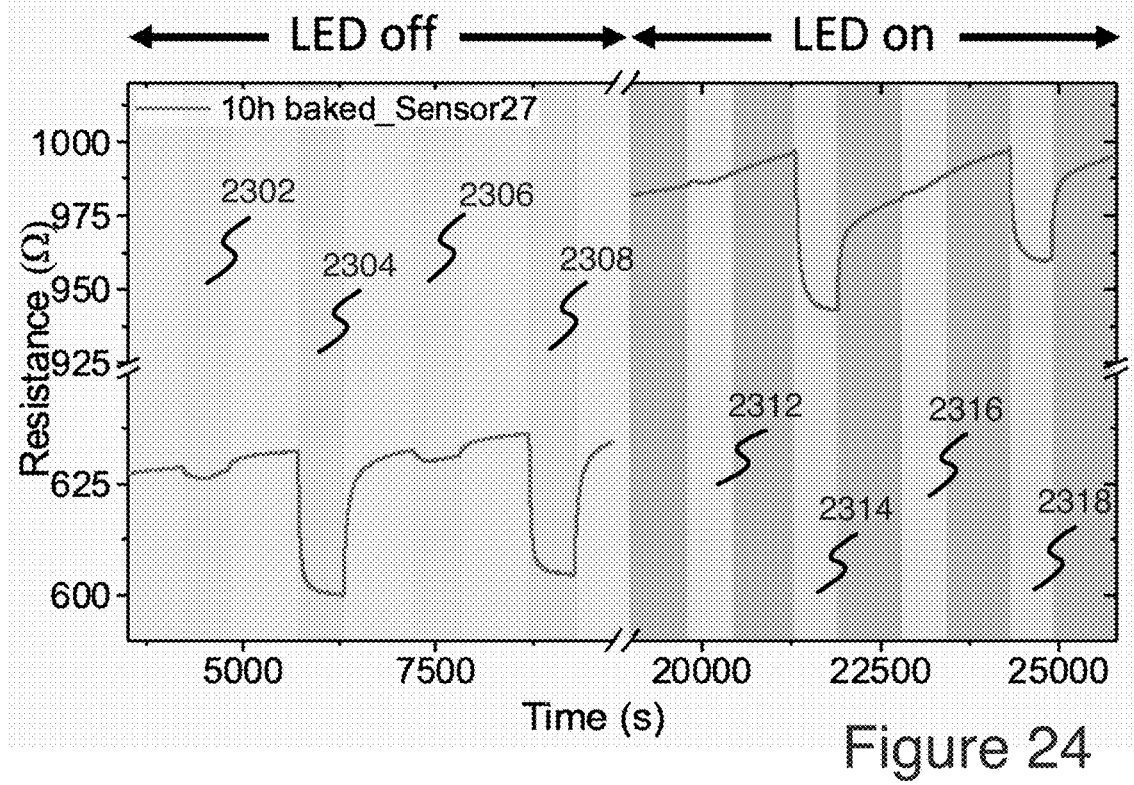
FIG. 24 is a plot of a change in resistance of a graphene sensor baked for ten (10) hours when exposed to alternating samples of water and ethanol, with and without illumination, in accordance with at least one of the various embodiments.

Yet another example of sensing more than one chemical, in accordance with at least one of the various embodiments, is shown in FIG. 24. In this example, the resistance of a sensor that was baked for 10 hr as described above (as opposed to 1 hr in the example shown in FIG. 23) is first recorded while the device is in the dark (LED off) and then compared to measurements obtained with a homogeneous optical illumination of the sensing area (LED on). In this case, the sensor response to ethanol (2402 and 2406) and water (2404 and 2408) is similar to that of the previous example in the LED-off setting. However, upon LED illumination with a wavelength of 365 nm, there is very little change in sensor resistance upon exposure to ethanol vapour (2412 and 2416). Exposure to water vapour, on the other hand, provides a noticeable decrease in sensor resistance (2414 and 2418). In comparison to the results shown in FIG. 23, the longer 10 hr baking time suppresses the initial rapid increase in sensor resistance, leaving only the slower contribution of decreasing resistance in signals cause by exposure to water vapour under UV illumination. In this example, and in accordance with at least one embodiment, UV illumination allows, for instance, the selective monitoring of water by making the sensor unresponsive to ethanol.

The results of FIGS. 23 and 24 show that under UV illumination, the sensors' response to ethanol exposure comprises an increase in resistance, rather than the negative change observed without illumination. In absolute value, the maximum resistance change of the sensor of FIG. 23 corresponds to 100Ω ($|\Delta R|/R=20\%$), a factor of 30 larger than the same measurement performed without UV. The sensor of FIG. 24 displays a weaker response to ethanol under UV, with a maximum signal amplitude of 1.6Ω ($|\Delta R|/R=0.3\%$), reached after 1 min of gas exposure at constant concentration. The sensor's resistance then gradually returns to the base value, even when the same ethanol vapour concentration remains in the sensing chamber. The different responses of the sensors of FIGS. 23 and 24 highlights, in accordance with some embodiments, the role of sensor preparation in adjusting the detection sensitivity to, for instance, ethanol under UV illumination.

UV illumination may also modify the sensors' response to water vapour. Regions corresponding to water vapour under illumination in FIGS. 23 and 24 show that sensors, while exposed to a constant concentration of water vapour, display an initial increase in resistance followed by a slower decrease that produces a distinctive peak. The sensor of FIG. 23 initially shows a rise in resistance of 120Ω, which is reached 45 s after injecting a constant concentration of water vapour. The resistance then decreases at a rate comparable to the one observed under the same conditions without UV. This sudden positive-negative change (i.e. asymmetric dispersion) in resistance under UV illumination is also observed with the sensor of FIG. 24, where the peak occurs within only 10 s of water vapour exposure. While feature is less pronounced in FIG. 24 ($\Delta R=2.4\Omega$ to $1.5\Omega$), it is distinctive. The different responses of the sensors of FIGS. 23 and 24 highlight, in accordance with some embodiments, the role of sensor preparation in adjusting the response signal to, for instance, water vapour under UV illumination.

Figure 26A:
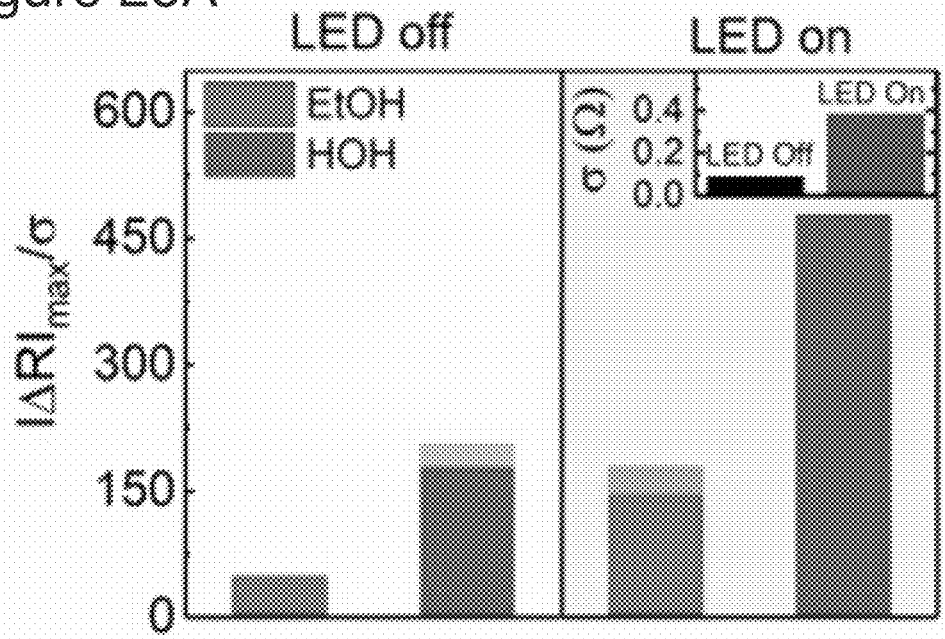
FIGS. 26A and 26B are plots of peak-to-peak resistance divided by the standard deviation measured within 60 s (darker region) and 120 s (lighter region) of the measurements shown in FIGS. 23 and 24, respectively, in accordance with various embodiments.
Figure 26B:
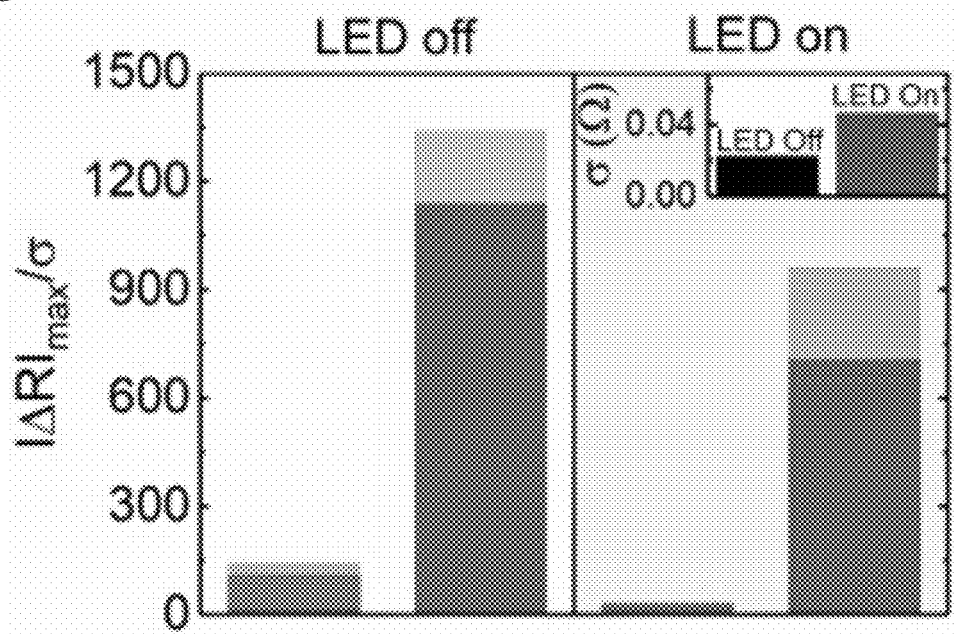

The detection sensitivity of the sensors used to obtain the results shown in FIGS. 23 and 24 are shown in FIGS. 26A and 26B, respectively. In this example, the sensitivity for ethanol and water is expressed as the peak to peak resistance $|R|$ measured over a 60 s period (dark bars) and 120 s period (lightly shaded bars) divided by the standard deviation of σ of the signal (see insets) as measured before exposure to analytes. This ratio is effectively the signal-to-noise ratio (SNR) indicative of the sensitivity. The increase in SNR observed upon illumination may be greater than a factor of 2, illustrating that, in accordance with some embodiments, the use of illumination improves the detection sensitivity of the sensor. Moreover, UV illumination is observed to improve gas detection by graphene by increasing selectivity as well as resulting in two different responses dependent on baking time after transfer printing.

Accordingly, and in accordance with various embodiments, sensor SNR may be improved be adjusting sensor preparation processes, such as a baking time, or post-annealing duration. For instance, the effect of the annealing process after transfer printing is directly illustrated by the y-axis scale in FIGS. 26A and 26B, which is inversely proportional to the magnitude of the noise σ shown in their insets. In FIG. 26A, corresponding to a sample annealed for 1 hour, σ is 0.1Ω and 0.4Ω without and with illumination, respectively, while in FIG. 26B, showing a sample annealed for 10 h, σ is 0.02Ω and 0.04Ω without and with UV illumination, respectively. FIGS. 26A and 26B illustrate how, for instance, the removal of PMMA residue can effectively increase the SNR, in some embodiment, by a factor of ~5 to ~10.

Upon exposure of ethanol and water vapour on the sensor of FIG. 23, the SNR values obtained were 50 and 190, respectively. The UV illumination on this sensor tripled the SNR with respect to both ethanol and water vapor, significantly increasing sensitivity. On the other hand, the sensor of FIG. 24 showed an SNR of 125 and 1240 for ethanol and water vapour, respectively, without UV illumination, which decreased to 30 and 780, respectively, with UV illumination. The different responses of the sensors of FIGS. 23 and 24 highlight, in accordance with some embodiments, the role of sensor preparation in adjusting the response signal to, for instance, water vapour under UV illumination.

The mechanisms governing such sensing behaviour may to relate, at least in part, to the interaction of the sensing surface with —OH portions of ethanol and water, which may be suppressed upon prolonged baking and exposure to UV illumination. The slow response of water in FIG. 24 may also indicate that another interaction, possibly associated with an $H^+$ bond, remains unaffected by UV illumination.

Figures 27A, 27B:
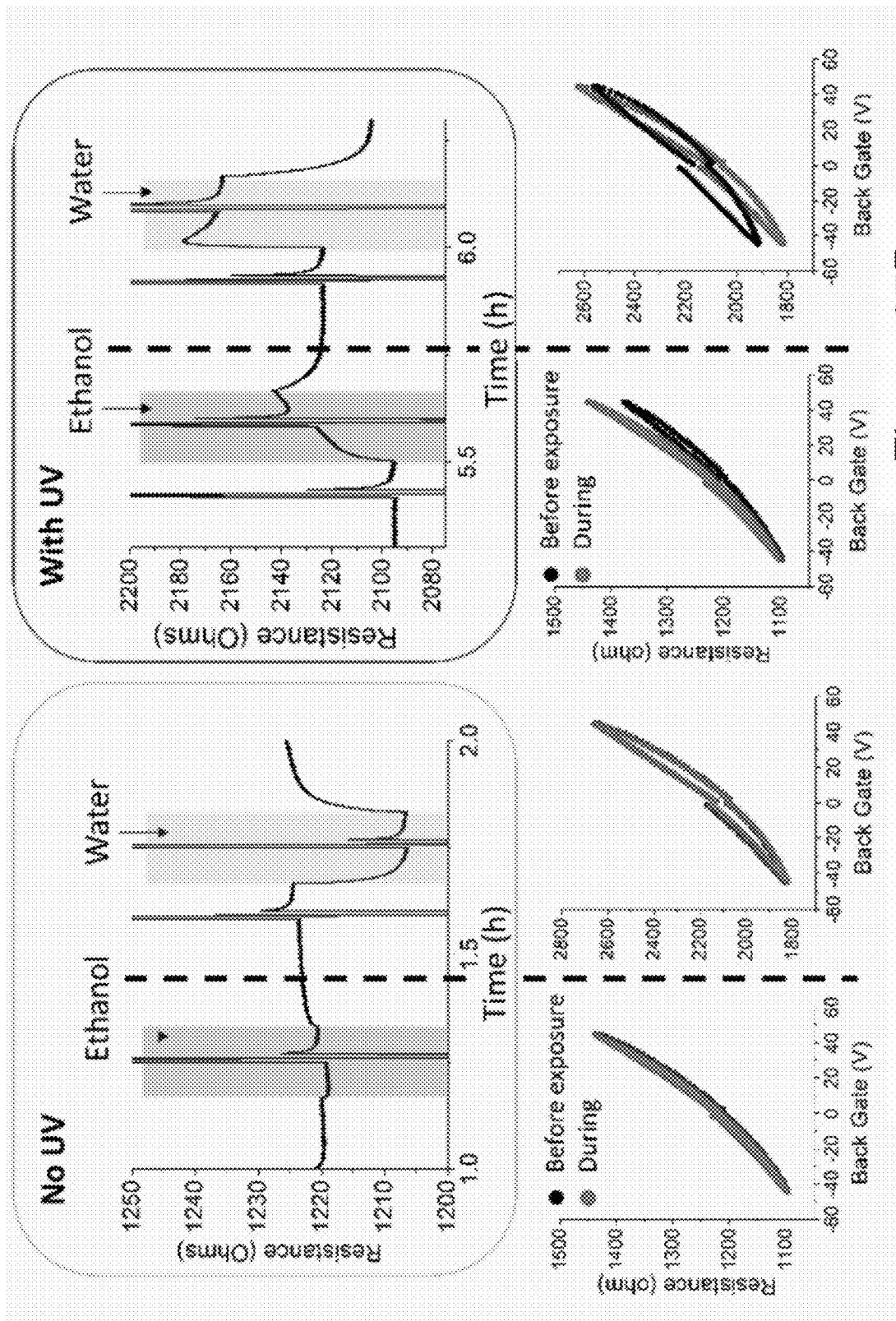
FIGS. 27A and 27B are plots of a graphene sensor resistance without and with illumination, respectively, with backgate voltage measurements (bottom panels) performed before (black line) and during (grey line) exposure to analytes, in accordance with various embodiments.

These phenomena may be further elucidated via backgate voltage measurements without illumination (FIG. 27A) and with illumination (FIG. 27B). These backgate voltage measurements show that the graphene sensors employed are p-doped, even during UV illumination and upon exposure to ethanol and water vapours. UV illumination of graphene may shift the chemical potential of the sensing region, rendering the graphene slightly less p-doped. Since the slope of the resistance at the backgate voltage 0 V increases under UV illumination, this may in part explain the increased responsivity of the sensor to the analytes sensed.

Figure 18:
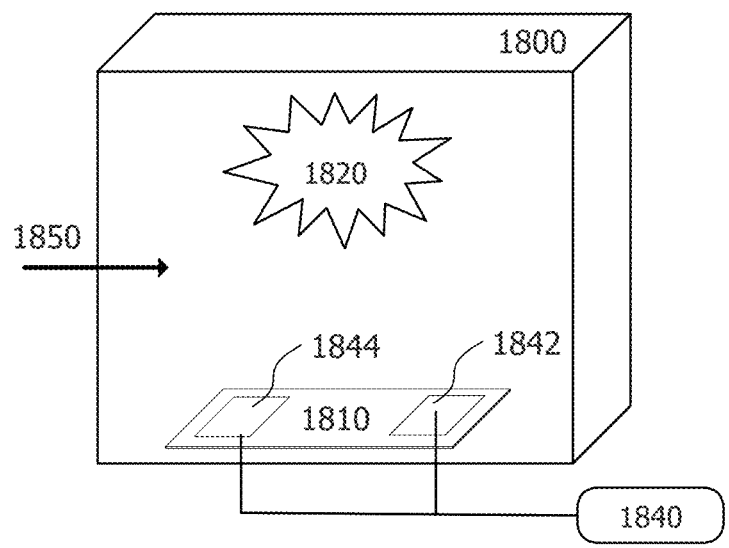
FIG. 18 is a schematic diagram of an exemplary system for performing chemical sensing with illumination, in accordance with at least one of the various embodiments.
Figure 19:
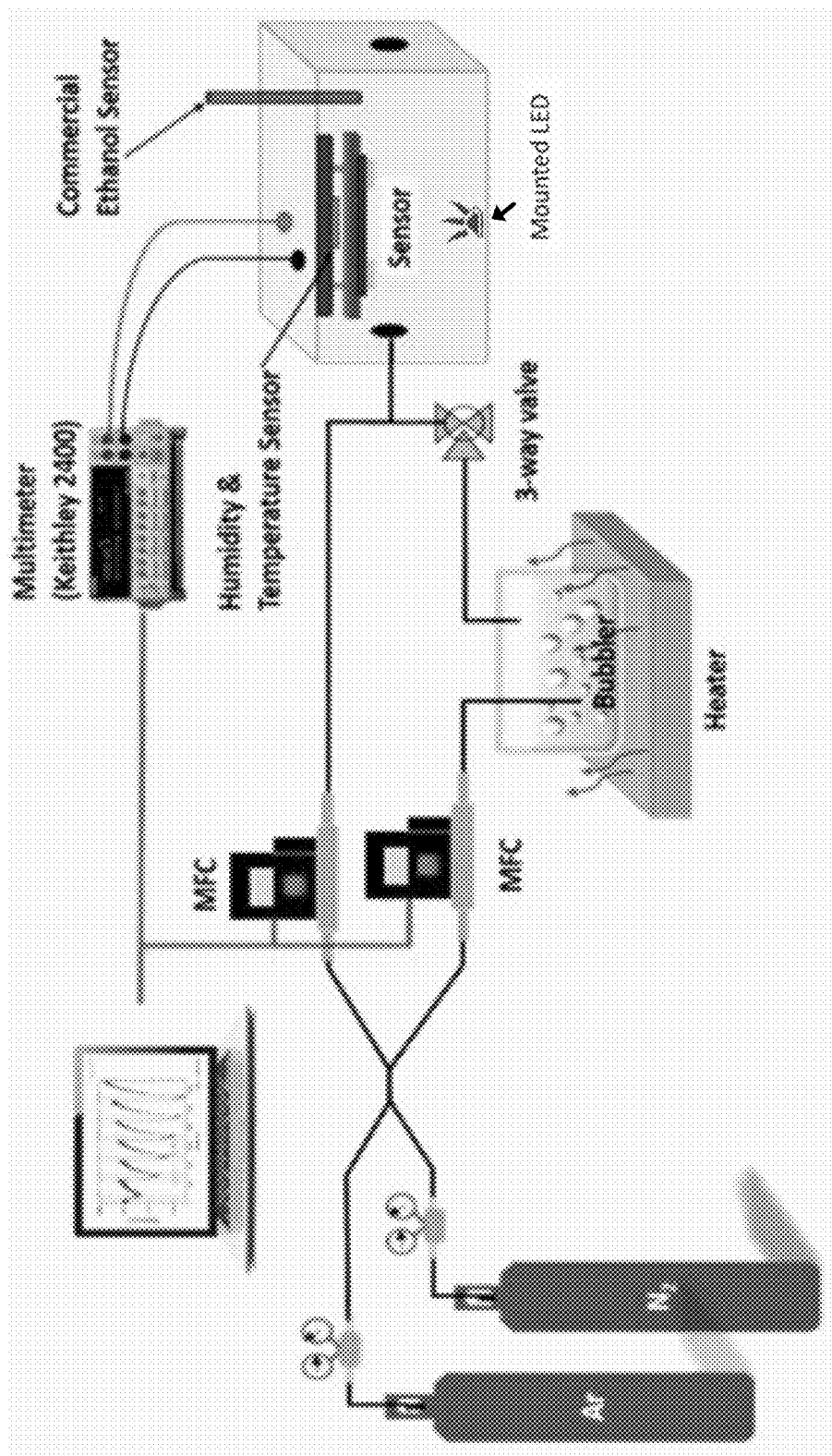
FIG. 19 is a schematic diagram of an experimental setup to test chemical sensing properties for one sample, in accordance with at least one of the various embodiments.
Figure 20:
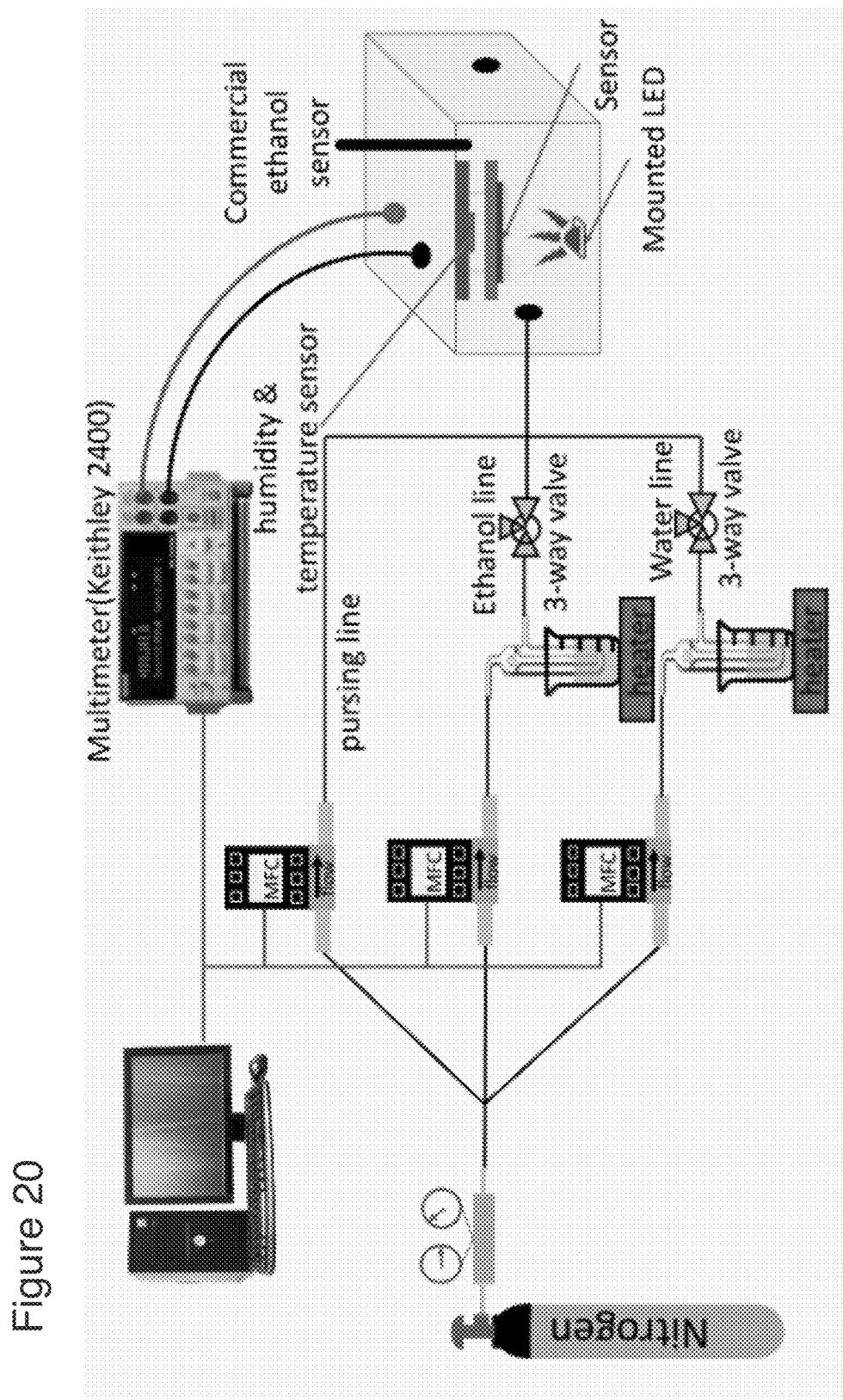
FIG. 20 is a schematic diagram of an experimental setup to test chemical sensing for more than one sample, in accordance with at least one of the various embodiments.

FIGS. 18 to 20 show schematic examples of systems in which the principles herein taught may be applied. FIG. 18 shows a schematic illustration of a system 1800 comprising a 2D sensor 1810, in accordance with at least one embodiment. Upon introduction of the sample 1850, electronic measurements 1840 are performed via electrodes 1842 and 1844 under illumination 1820. Various embodiments may additionally include electronic systems which can apply electric signals and measure electric properties such as current, resistance, potential, or capacitance. Examples of such systems may include, for example, a voltmeter, ammeter, ohmmeter, multimeter, current amplifier, operational amplifier, or the like. Such instruments may be external to the system 1800 or disposed on or within the system. Measurements 1840 may be performed manually or automatically through the employment of digital processors disposed within or on the system, or externally via electronic devices such as computers, mobile devices, arduinos, or the like.

Illumination 1820 may be provided by one or more sources such as an LED, a lamp, a bulb, or the like, to provide an appropriate wavelength or spectrum of wavelengths for sensing one or more chemical species of interest. For example, an LED emitting UV radiation with a wavelength of 365 nm may be used alone or in combination with an infrared lamp emitting light with wavelengths from 3000 nm to 6000 nm to illuminate a 2D sensor to enhance signal and provide selectivity for a particular molecular species. Illumination may be uniform or non-uniform across the surface of the sensor in order to optimize sensor performance. Other narrow or broad-spectrum light sources may also or alternatively be considered, without departing from the general scope and nature of the present disclosure.

Samples may be introduced directly into the system 1800 for measurements, or introduced to the sensor system by other appropriate means. FIG. 19 shows an exemplary system in which the sensor is integrated within a connected network for sample introduction and data recording and analysis, in this example, for the purposes of validating, characterizing and/or calibrating the sensor. In one such example, high purity grade argon (or nitrogen) gas is used as a carrier and mixing gas during experiments. The gas is directed into two lines, the first consisting of a mass flow controller (MFC) (0-1000 sccm) to purge the chamber and control the concentration of the sample. The second line is composed of an MFC (0-100 sccm) connected to a bubbler for carrying the ethanol vapors to the aluminum chamber. In order to control concentrations, the bubbler may be left at room temperature, or heated with a heater, and monitored via a thermocouple. A manual 3-way valve is used to divert the sample vapors during purging of the chamber. A calibrated commercial sensor, such as an ethanol sensor, may be mounted onto the chamber and used as reference to quantify the ppm levels of sample inside the testing chamber, thus allowing for comparative quantitative analysis between the 2D sensor, as described herein, and other commercially available sensors. A temperature and humidity sensor may be placed under the graphene sensor as well as in the flow to monitor the humidity and temperature condition at the surface of the sensor. Properties such as the sensor resistance is obtained from data such as current-voltage (I-V) characteristics of each sensor as measured by a multimeter. Results may be stored and/or displayed on systems such as a laptop, mobile device, or the like.

FIG. 20 shows a schematic diagram of a setup in accordance with another embodiment in which multiple samples may be introduced to the sensor, again, in this example, for the purposes of validating, characterizing and/or calibrating the sensor. In this example, chemical sensing experiments are carried out in a 250 ml dynamic gas flow chamber in which a graphene-based sensor is placed. Three mass flow controllers (MFCs) are connected to the chamber to supply gas such as $N_2$ and form a single output. The ratio and flow velocity of gas, is accurately controlled by the MFCs. Two lines are connected to a bubbler for carrying samples such as ethanol and water vapor to the chamber. To access a range of low concentrations, the bubblers can be kept at room temperature. The electrical resistance of the graphene sheet can be obtained continuously or at fixed intervals from electric properties such as linear current-voltage (I-V) characteristic curves measured by a multimeter. Commercial humidity, temperature and sample detectors may also be integrated inside the sensor chamber to ensure that environmental conditions do not affect measurements. A LED located 5 mm above the sensing area allows homogenous illumination of the device. The LED used in experimentation may, in some embodiments, have a wavelength of 365 nm and deliver an optical power of on the order of 4 mW over the 1 cm×1 cm sensing area. As will be appreciated by the skilled artisan, embodiments are not limited to the components described in FIGS. 19 and 20, and various components may be removed, replaced or added, and dimensions and magnitudes modified as appropriate for a particular sensing scheme.

Figure 21A:
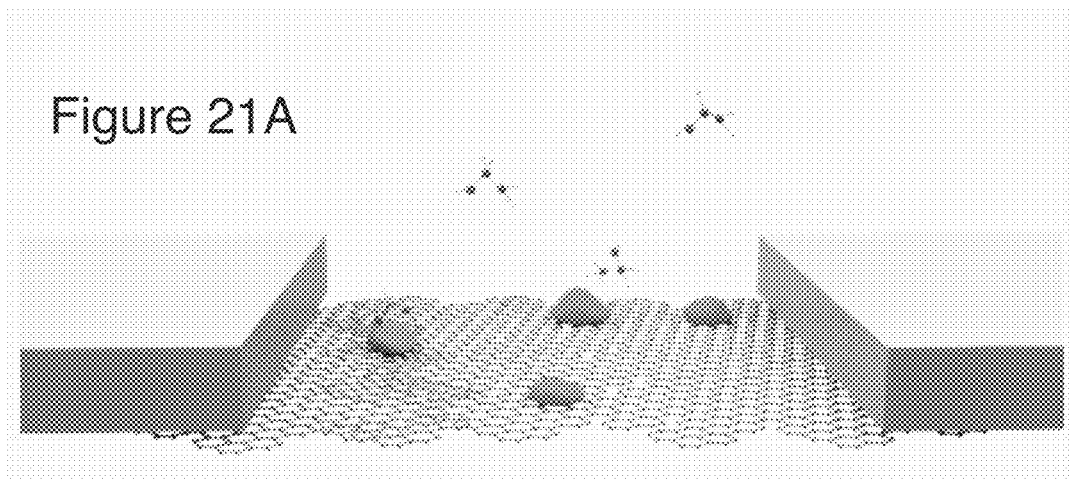
FIG. 21A and FIG. 21B are schematic diagrams of a graphene sensor without illumination (FIG. 21A) and with illumination (FIG. 21B) that can be used in combination for gas sensing, in accordance with at least one of the various embodiments.
Figure 21B:
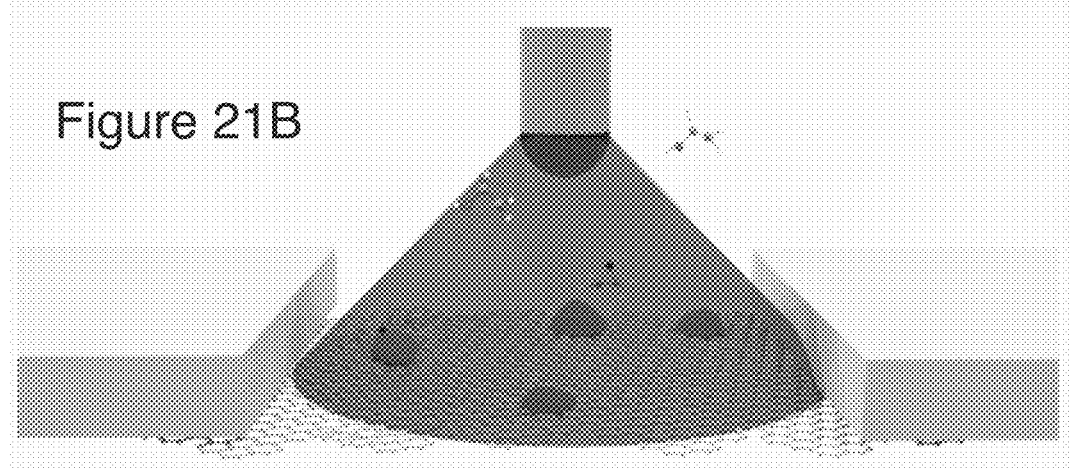

In at least one other embodiment, more than one sensor may be employed to perform measurements. FIGS. 21A and 21B show an example of a system with two sensors: one kept in the dark (FIG. 21A), while another is exposed to illumination (FIG. 21B). The comparison between their respective resistance changes induced by the presence of a chemical in air can be used to identify the nature and/or concentration of that chemical. This design may optionally be combined with other selectivity techniques, such as filters and surface coatings on the sensing area. For example, in FIGS. 21A and 21B, the exemplary CVD graphene-based sensor located between two electrodes is illustrated with residues on its surface, which may comprise substances to enhance sensor performance, such as PMMA.

Figure 22:
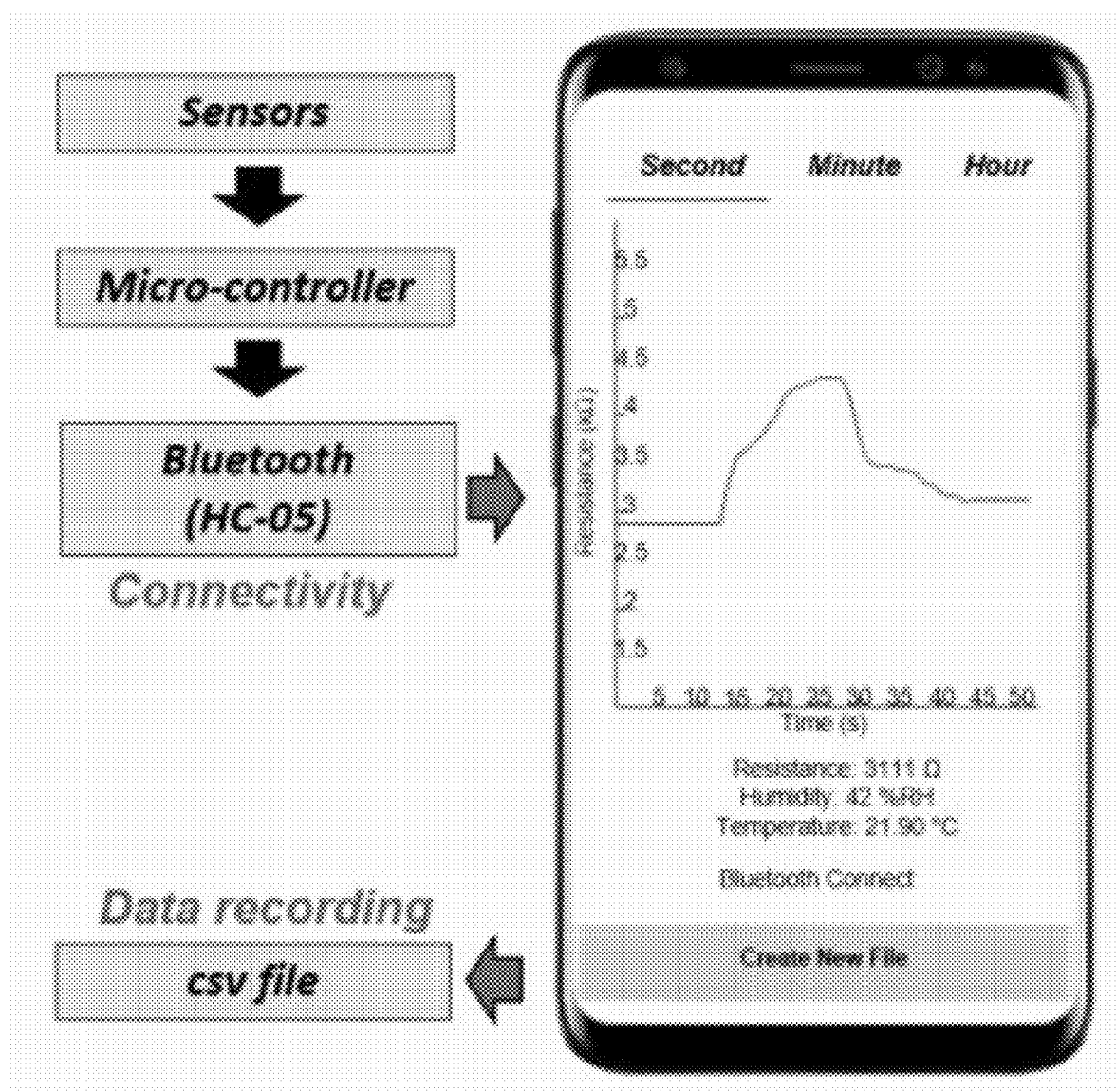
FIG. 22 is a schematic process diagram illustrating data flow in an automated system, in accordance with one embodiment of the disclosure.

Other embodiments may include automatic and/or remote control of sensing systems. FIG. 22 schematically shows one such embodiment wherein an application on a mobile electronic device such as a cell phone is wirelessly operably coupled with a sensing system. Experimental conditions such as sample flow rate, humidity, temperature, illumination selection (e.g. UV LED, IR, etc.), wavelength and/or intensity can be set remotely and communicated to the system via communication protocols such as BlueTooth™, Wifi, ultra-wideband, radio, or the like, to be effectuated by, for instance, microcontrollers integrated within the sensing system. Data processing and analysis could, in some embodiments, be performed and visualized on the mobile device, with data writing and storing functionality.

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Except to the extent necessary or inherent in the processes themselves, no particular order to steps or stages of methods or processes described in this disclosure is intended or implied. In many cases the order of process steps may be varied without changing the purpose, effect, or import of the methods described.

Information as herein shown and described in detail is fully capable of attaining the above-described object of the present disclosure, the presently preferred embodiment of the present disclosure, and is, thus, representative of the subject matter which is broadly contemplated by the present disclosure. The scope of the present disclosure fully encompasses other embodiments which may become apparent to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims. Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, as may be apparent to those of ordinary skill in the art, are also encompassed by the disclosure.

What is claimed is:

1. A system for differentially identifying presence of distinct designated chemical species within a chemical sample, the system comprising:
    a two-dimensional sensor, said two-dimensional sensor comprising sensor surface residue providing a designated electrical sensing property that results in respective designated differentiable adsorption sensor responses when exposed to the distinct designated chemical species within the chemical sample as a function of illumination;
    a source of illumination providing illumination to the two-dimensional sensor that induces, in accordance with said designated electrical sensing property, said respective designated differentiable adsorption sensor responses to the distinct designated chemical species, wherein a first one of said respective designated differentiable adsorption sensor responses comprises a sign reversal of a relative change in resistance of said two-dimensional sensor monitored as a function of time upon adsorption of a corresponding first one of the distinct designated chemical species under illumination as compared to adsorption of the corresponding first one of the distinct designated chemical species in absence of said illumination, whereas a second one of said respective designated differentiable adsorption sensor responses to a corresponding second one of the distinct designated chemical species is devoid of said sign reversal of said relative change in resistance irrespective of said illumination, thereby conveying differentiability of said respective designated differentiable adsorption sensor responses; and
    a signal acquisition device that acquires and compares a sensor signal in presence and absence of said illumination to differentially identify the respective designated differentiable adsorption sensor responses as a function of illumination to differentially identify presence of the distinct designated chemical species within the chemical sample accordingly;
    wherein said signal acquisition device comprises a digital processor configured to compare said sensor signal in presence and absence of said illumination; and
    upon identifying said sign reversal of said relative change in resistance, said digital processor differentially identifies presence of said corresponding first one of the distinct designated chemical species;

whereas upon failing to identify said sign reversal of said relative change in resistance, said digital processor differentially identifies presence of said corresponding second one of the distinct designated chemical species.

2. The system of claim 1, wherein said two-dimensional sensor comprises a graphene sheet.

3. The system of claim 2, wherein said sensor surface residue comprises a polymethylmethacrylate (PMMA) residue.

4. The system of claim 3, wherein said PMMA residue is defined by a molecular weight of about 950,000 g/mol prepared in an anisole solution of about 6% concentration.

5. The system of claim 1, wherein only one of said respective designated differentiable adsorption sensor responses is characterized by an asymmetric dispersion.

6. The system of claim 1, wherein said illumination comprises a wavelength corresponding to an ultraviolet wavelength.

7. The system of claim 6, wherein said wavelength is between 300 nm and 400 nm.

8. The system of claim 1, wherein said two-dimensional sensor is previously subjected to a baking process to produce an annealed sensor surface residue as said sensor surface residue.

9. The system of claim 8, wherein said baking process modifies one or more of an area, density, thickness, or electrical property of said sensor surface residue.

* * * * *